US012676464B2

(12) United States Patent
Menton et al.

(10) Patent No.: US 12,676,464 B2
(45) Date of Patent: *Jul. 7, 2026

(54) MOUNTABLE ELECTRICAL ENCLOSURE WITH CONDUIT PASSTHROUGH

(71) Applicant: Esdec, Inc., Walnut Creek, CA (US)

(72) Inventors: Duane Menton, Vallejo, CA (US); Bryan R. Falk, Chandler, AZ (US); Susan E. Stark, Branchville, NJ (US); Yann Schwarz, Oakland, CA (US); Jon Ash, Phoenix, AZ (US)

(73) Assignee: Enstall US, Inc., Walnut Creek, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 18/587,543

(22) Filed: Feb. 26, 2024

(65) Prior Publication Data

US 2024/0204499 A1 Jun. 20, 2024

Related U.S. Application Data

(63) Continuation-in-part of application No. 18/108,191, filed on Feb. 10, 2023, now Pat. No. 11,916,364, which is a continuation of application No. 17/517,181, filed on Nov. 2, 2021, now Pat. No. 11,581,717.

(51) Int. Cl.
*H02G 3/08* (2006.01)
*H02S 40/34* (2014.01)

(52) U.S. Cl.
CPC ............. *H02G 3/088* (2013.01); *H02G 3/083* (2013.01); *H02S 40/34* (2014.12)

(58) Field of Classification Search
None
See application file for complete search history.

(56) References Cited

U.S. PATENT DOCUMENTS

| | | | | |
|---|---|---|---|---|
| 4,016,356 A | * | 4/1977 | McLoughlin | ........ H02G 15/188 |
| | | | | 174/DIG. 8 |
| 5,048,572 A | * | 9/1991 | Levine | ....................... F16L 9/21 |
| | | | | 174/DIG. 8 |
| 5,140,746 A | * | 8/1992 | Debbaut | .............. H02G 15/003 |
| | | | | 174/76 |
| 8,471,145 B2 | | 6/2013 | Suzuki | |
| 9,521,761 B1 | * | 12/2016 | Shotey | ..................... H05K 5/00 |
| 10,230,227 B1 | | 3/2019 | Wade et al. | |
| 11,695,261 B2 | | 7/2023 | Wade et al. | |

(Continued)

FOREIGN PATENT DOCUMENTS

WO 2021102062 A1 5/2021

*Primary Examiner* — Krystal Robinson
(74) *Attorney, Agent, or Firm* — Temmerman Law; Mathew J. Temmerman

(57) ABSTRACT

A junction box mountable on a roof surface, comprising a housing unit and an enclosing unit, the housing unit and the enclosing unit combining to form a waterproof assembly. The housing unit is mountable to a roof surface via a flashing having a continuous, raised waterproofing track that mates with a waterproofing recess in a bottom surface of the housing unit to create a waterproofing zone inside the housing unit. At least one bottom pass through is located within the waterproofing zone and provides a channel from the internal housing area through the roof surface.

24 Claims, 28 Drawing Sheets

(56) References Cited

U.S. PATENT DOCUMENTS

| | | | |
|---|---|---|---|
| 2002/0125031 A1* | 9/2002 | Gilleran | H02G 3/123 |
| | | | 174/58 |
| 2007/0137876 A1* | 6/2007 | Miettinen | H05K 5/069 |
| | | | 174/50.56 |
| 2010/0288894 A1* | 11/2010 | Hopkins | H02G 3/126 |
| | | | 248/220.21 |
| 2011/0030832 A1* | 2/2011 | Larson | H02G 3/0481 |
| | | | 138/137 |
| 2017/0110863 A1 | 4/2017 | Wentworth | |
| 2018/0226918 A1 | 8/2018 | De Vogel | |
| 2020/0382049 A1 | 12/2020 | Wares | |
| 2021/0207742 A1* | 7/2021 | Dickinson | F16B 37/045 |
| 2021/0328415 A1 | 10/2021 | Meine | |
| 2024/0204499 A1* | 6/2024 | Menton | H02G 3/083 |

* cited by examiner

MOUNTABLE ELECTRICAL ENCLOSURE WITH CONDUIT PASSTHROUGH

This application is a Continuation-in-Part application based on U.S. patent application Ser. No. 18/108,191, filed Feb. 10, 2023 and granted as U.S. Pat. No. 11,916,364 on Feb. 27, 2024, and which was a continuation application based on Ser. No. 17/517,181, filed Nov. 2, 2021 and granted as U.S. Pat. No. 11,581,717 on Feb. 14, 2023, the disclosure of which is incorporated herein in its entirety.

BACKGROUND OF THE DISCLOSURE

Technical Field

The present embodiment relates generally to mountable junction boxes, and more particularly to a waterproof rooftop junction box adapted to directly connect with a rail, roof, or other structures affixed to a roof top of a building. The mountable junction boxes of the present invention are particularly well-adapted for use in conjunction with solar panel assemblies.

Description of the Related Art

Mountable junction boxes may be used to receive, route, and connect portions of utility systems, including solar utility systems. For instance, electrical junction boxes may receive wire cables from multiple electrical components. The wire cables may be electrically coupled within the electrical junction boxes. Such electrical coupling may electrically couple multiple electrical components and may offer waterproofing functions. The junction boxes may be covered or otherwise protected, which may reduce interaction with the electrical cables coupled therein. In some cases, multiple wire types including neutral, hot, and other wires may be coupled within an individual junction box.

A small metal or plastic junction box may form a part of an electrical conduit or thermoplastic-sheathed cable (TPS) wiring system in a building. If designed for surface mounting, it is used mostly in ceilings, under floors or concealed behind an access panel—particularly in domestic or commercial buildings. A similar, usually wall mounted, container used mainly to accommodate switches, sockets and the associated connecting wiring is called a pattress.

Junction boxes form an integral part of a standard circuit protection system where circuit integrity must be provided, as for emergency lighting or emergency power lines, or the wiring between a nuclear reactor and a control room. Junction boxes used within a home or on the interior of a building are generally composed of metal compositions or plastics. Commercially available junction boxes of this type are often poorly suited for use in locations where they are exposed to outdoor environmental conditions. For instance, junction boxes composed of metals or plastics may rust or deteriorate due to exposure to water and heat.

Some junction boxes may be configured for exterior or outdoor use. The exterior junction box may be used to connect and/or route cables from one or more external devices. The external junction boxes may be attached to an exterior surface of a structure and may be at least partially environmentally sealed. However, existing outdoor junction boxes suffer from several deficiencies. For instance, existing outdoor junction boxes are poorly integrated with the exterior surfaces, which may result in concentration of snow and water on the existing junction box. Additionally, installation of standard outdoor junction boxes is difficult, which may result in poorly attached outdoor junction boxes. In addition, existing waterproof junction boxes with pass throughs are not attachable to a roof via a rail in combination with metal flashings.

Therefore, there is a need for a junction box for mounting an electrical enclosure to a solar rail, roof mount, or the like. Such a junction box device would provide a means of affixing an electrical enclosure to a roof or building. Furthermore, such a device would provide a variety of rail and bracket types such that a variety of roof securement configurations would be obtained. Moreover, such a device would provide a cost-effective electrical enclosure adapted to use with a variety of wire types. The present embodiment overcomes shortcomings in the field by accomplishing these critical objectives.

SUMMARY OF THE INVENTION

To minimize the limitations found in the prior art, and to minimize other limitations that will be apparent upon the reading of the specification, the present disclosure provides a mountable junction box including a housing unit and an enclosing unit, the housing unit and enclosing unit combining to form a waterproof assembly. In some embodiments, the housing unit includes an internal housing area and at least two bottom pass throughs, the internal housing area further having a bottom surface with a plurality of fixation points. In other embodiments, the mountable junction box includes a housing unit electrical port, the housing unit operably configured to be mounted to a roof via a bracket and a rail, the bracket comprising at least one lip fastener and at least one bracket clip. In some embodiments, the junction box is alternately operably configured to be mounted directly to a roof incorporating a flashing. Finally, in some configurations the mountable junction box includes a waterproofing interior indentation and bottom surface fastener holes to assist securement of the assembly to a roof.

In some embodiments, a variety of brackets and rail configurations are contemplated. For example, the rail may include a compacted rail, an elongated rail, a rounded clip rail, or a rectangular clip rail. Further, in some embodiments a hinge unit includes a plurality of hinge unit joinder segments, the hinge joinder segments enabling reversible attachment to the roof mounting elements. In some embodiments, a housing unit lock and an enclosing unit lock combine to secure the mountable junction box in a closed configuration. In other embodiments, the housing unit lock and the enclosing unit lock enable the enclosing unit to lock in a water-sealed engagement with the housing unit, thereby preventing the entry of water into the housing unit.

In another embodiment, the underside of the housing unit includes a depression waterproofing indentation and a rubber seal. In some embodiments, the depression waterproofing indentation and the rubber seal form an ovular shape concentric with the dimensions of the housing unit interior such that a user can reach into and manipulate items within the mountable junction box. In another embodiment, a bracket (also referred to herein as "rail hanger") comprises a lip, a lip fastener, and a bracket clip. In some embodiments, the bracket is adapted for use with a rail (i.e., a din rail) and/or similar conduit fittings. Finally, in some embodiments a depression waterproofing indentation and rubber seal form an ovular shape, the waterproofing indentation preventing water infiltration through the roof while also providing structural stability to the mountable junction box. It is a first objective of the present invention to provide a waterproof means of mounting an electrical enclosure to a solar rail, roof mount, or the like.

A second objective of the present invention is to provide a means of affixing an electrical enclosure to a roof or building.

A third objective of the present invention is to provide a variety of rail and bracket types such that a variety of roof securement configurations may be obtained.

Another objective of the present invention is to provide a means of both direct attachment of a mountable junction box to a roof via a flashing, and an indirect means of attachment of a junction box to a roof mediated by both a bracket and a rail.

Yet another objective of the present invention is to provide a cost-effective electrical enclosure adapted to use with a variety of wire types.

These and other advantages and features of the present invention are described with specificity below so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

Figure 1:
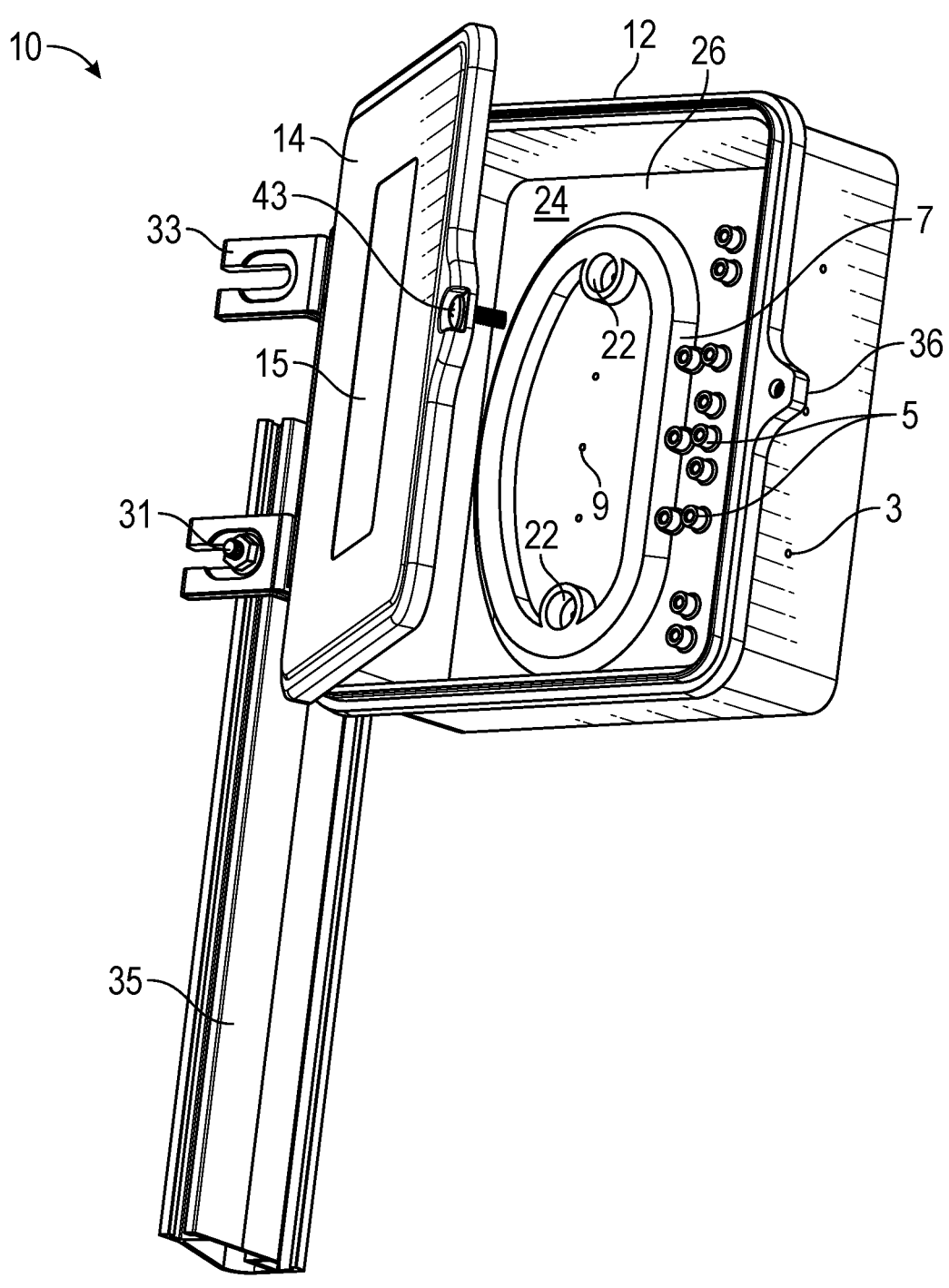
FIG. 1 is a perspective view of a mountable junction box including a housing unit, an internal housing area, a bottom surface, bottom pass throughs, and additional elements according to the preferred embodiment of the present invention.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Referring to FIGS. 1-6 of the drawings, a mountable junction box for protecting different wiring systems from water leakage and other damage is illustrated in different views and generally designated by the reference numeral 10.

The mountable junction box 10 comprises a housing unit 12 and an enclosing unit 14. In some embodiments, the housing unit 12 includes an internal housing area 26, bottom pass throughs 22, and housing unit electrical ports 13. In some embodiments, the bottom pass throughs 22 are oriented proximal to fastener holes 9 adapted to combine with fasteners 63 in order to secure the junction box 10 to a roof 70. In some embodiments, the housing unit 12 is directly attached to a roofing attachment panel or flashing 74, the housing unit 12 positioned at least a first distance from a plurality of boundaries of the flashing 74. Notably, fasteners 63 may include screws, bolts, bolt and screw assemblies, nails, clamps, and similar fasteners known in the art.

In some embodiments, the internal housing area 26 further includes a bottom surface 24 having a plurality of fixation points 5 (FIG. 1). In some embodiments, the fixation points 5 allow attachment of the mountable junction box to a roof, rail (i.e., a din rail), or roof mounting, thereby providing the junction box 10 with various roof mounting capabilities, including flashing and conduit pass through options. The bottom surface 24 includes a waterproofing interior indentation 7 and the bottom surface fastener holes 9 to assist securement to a railing or roof mounting assembly.

In the preferred embodiment, the mountable junction box is capable of mounting directly to a roof via flashing 74, or rather indirectly mounting to a roof via a bracket 30 and rail assembly. In some embodiments, the mountable junction box serves as a communal meeting spot for electrical wires 75, where the electrical wires 75 connect and/or assemble before diverging to alternate spatial locations. In other embodiments, the mountable junction box 10 protects active (i.e., hot or black), white (neutral), grounding (green or copper), and other electrical wires in order to carry electrical power to permit lighting and secondary functions.

Figure 2:
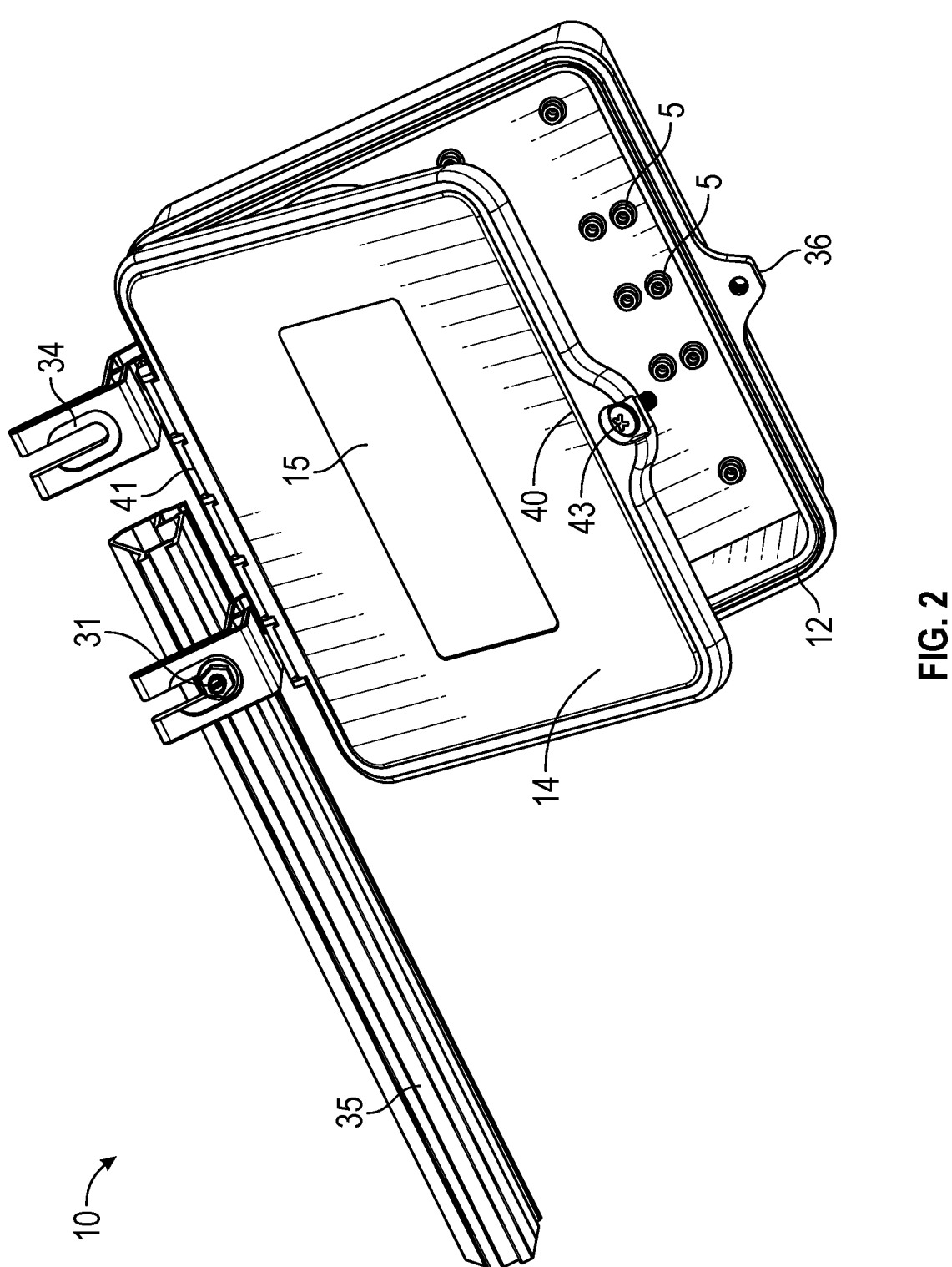
FIG. 2 shows another view of the present invention, illustrating an enclosing unit, a hinge unit, and additional elements of the mountable junction box.
Figure 4:
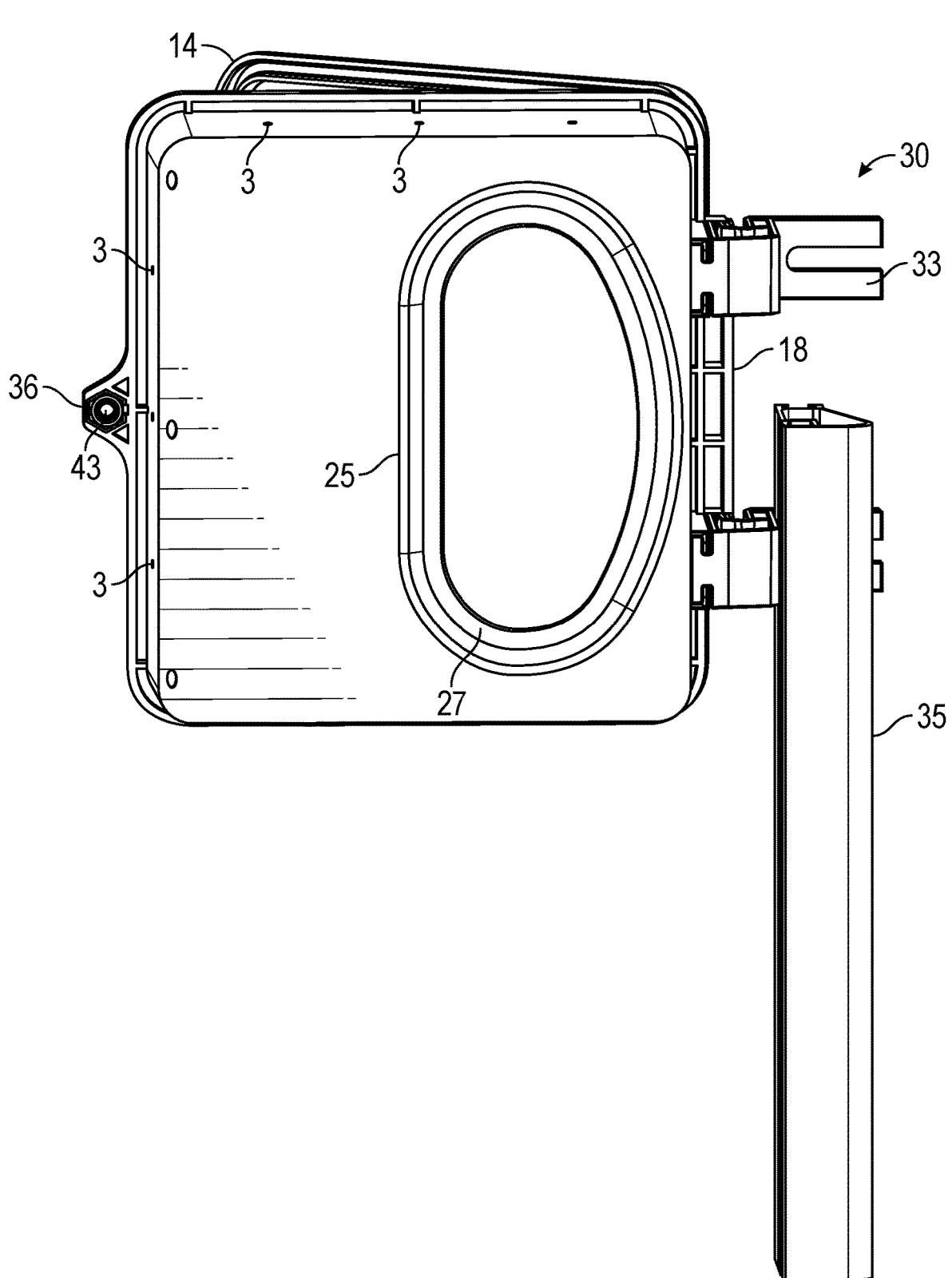
FIG. 4 is a bottom view of the mountable junction box including a depression waterproofing indentation and a rubber seal according to one embodiment of the present invention.

As shown in FIG. 1, the enclosing unit 14 is attached to the housing unit 12 via a hinge unit 18 as shown in FIG. 4. In some embodiments, the enclosing unit 14 includes an enclosing unit rim 15 permitting the placement of small items such as installer's tools during installation on a slanted roof. In other embodiments, the hinge unit 18 comprises a swiveling pivot, a docking unit, and/or a hinge locking unit. As shown in FIG. 1 and FIG. 2, the enclosing unit 14 provides waterproof protection to the internal housing area 26 and bottom surface 24 of the internal housing area 26. The enclosing unit 14 may also include an enclosing unit area 68 and an informational sticker 69. The housing unit 12 and the enclosing unit 14 are configured in space to enable an installer's hands to reach inside the junction box to conduct his or her operations.

Figure 3:
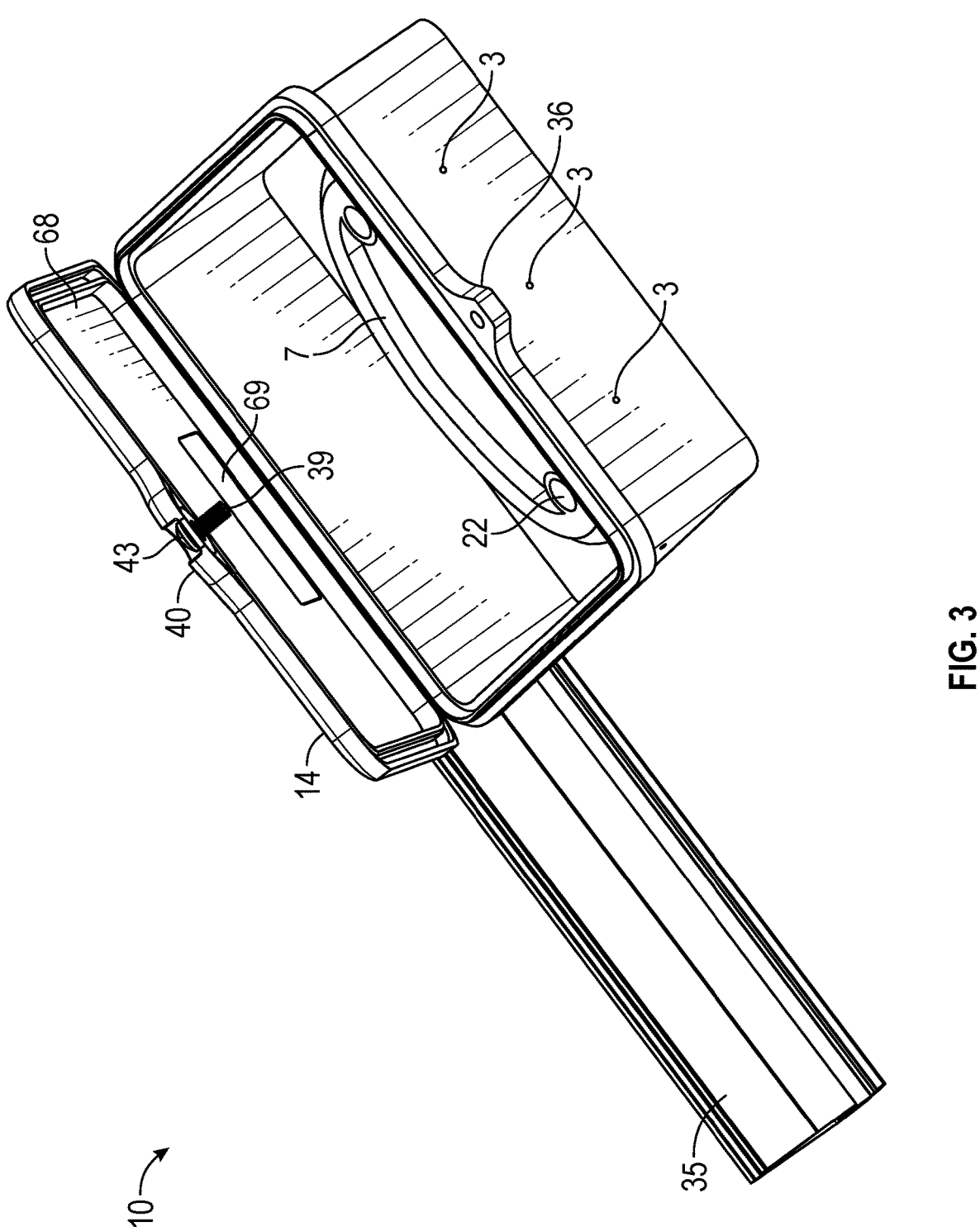
FIG. 3 is a perspective view of the mountable junction box in an open configuration including a housing unit lock, an enclosing unit lock, and additional elements according to one embodiment of the present invention.
Figure 11:
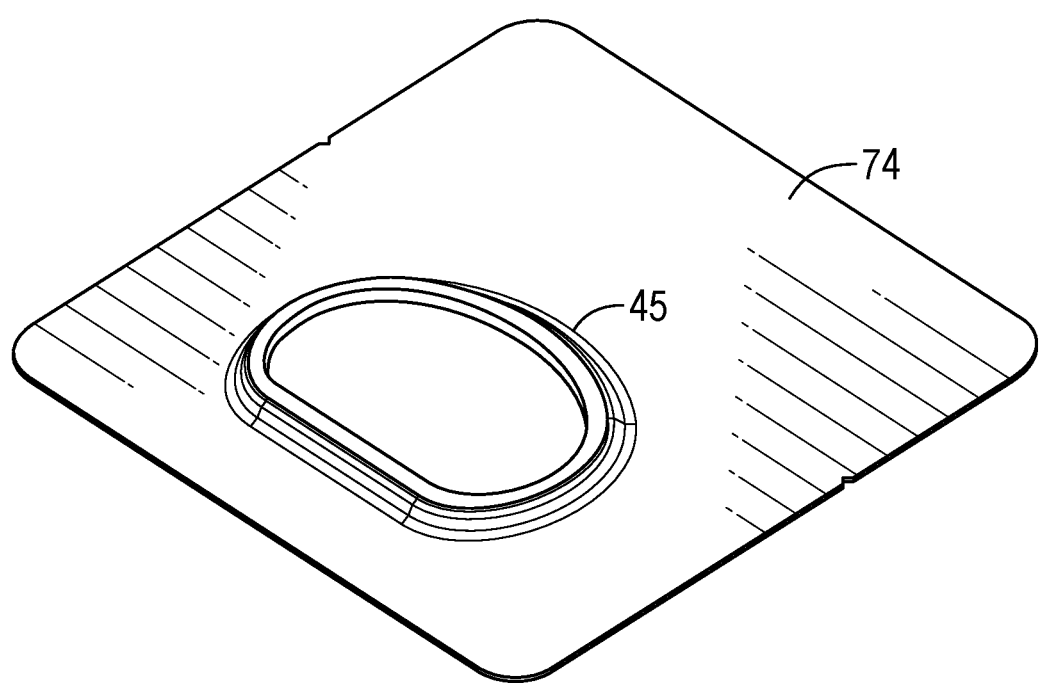
FIG. 11 is a top view of a flashing and rubber sealing elements according to one embodiment of the present invention.

In the preferred embodiment, and as shown in FIG. 2 and FIG. 3, the hinge unit 18 permits facile connection of the enclosing unit 14 and the housing unit 12. In some embodiments, the hinge unit includes a plurality of hinge unit joinder segments, the hinge joinder segments enabling removeable attachment to the railing and/or roof mounting elements. In other embodiments, a housing unit lock 36, a housing unit lock screw 43, and an enclosing unit lock 40 of the enclosing unit 14 combine to secure the mountable junction box 10 in a closed configuration as shown in FIG. 16, FIG. 17A, FIG. 17B, and FIG. 22. Fasteners 63 may comprise screws, bolts, nails, clamps, and similar elements known in the art. The housing unit lock 36 and the enclosing unit lock 40 enable the enclosing unit 14 to lock in a water-sealed engagement with the housing unit 12, thereby preventing the entry of water into the housing unit 12. As depicted in FIG. 4, the underside of the housing unit 12 includes a continuous waterproofing recess 25 and a rubber seal 27. In some embodiments, the flashing 74 comprises a continuous raised waterproofing track 45 (see FIG. 11) that mates with the junction box continuous waterproofing recess 25 thereby forming a circumscribed area and waterproofing zone 71 (see FIG. 18A).

Figure 5:
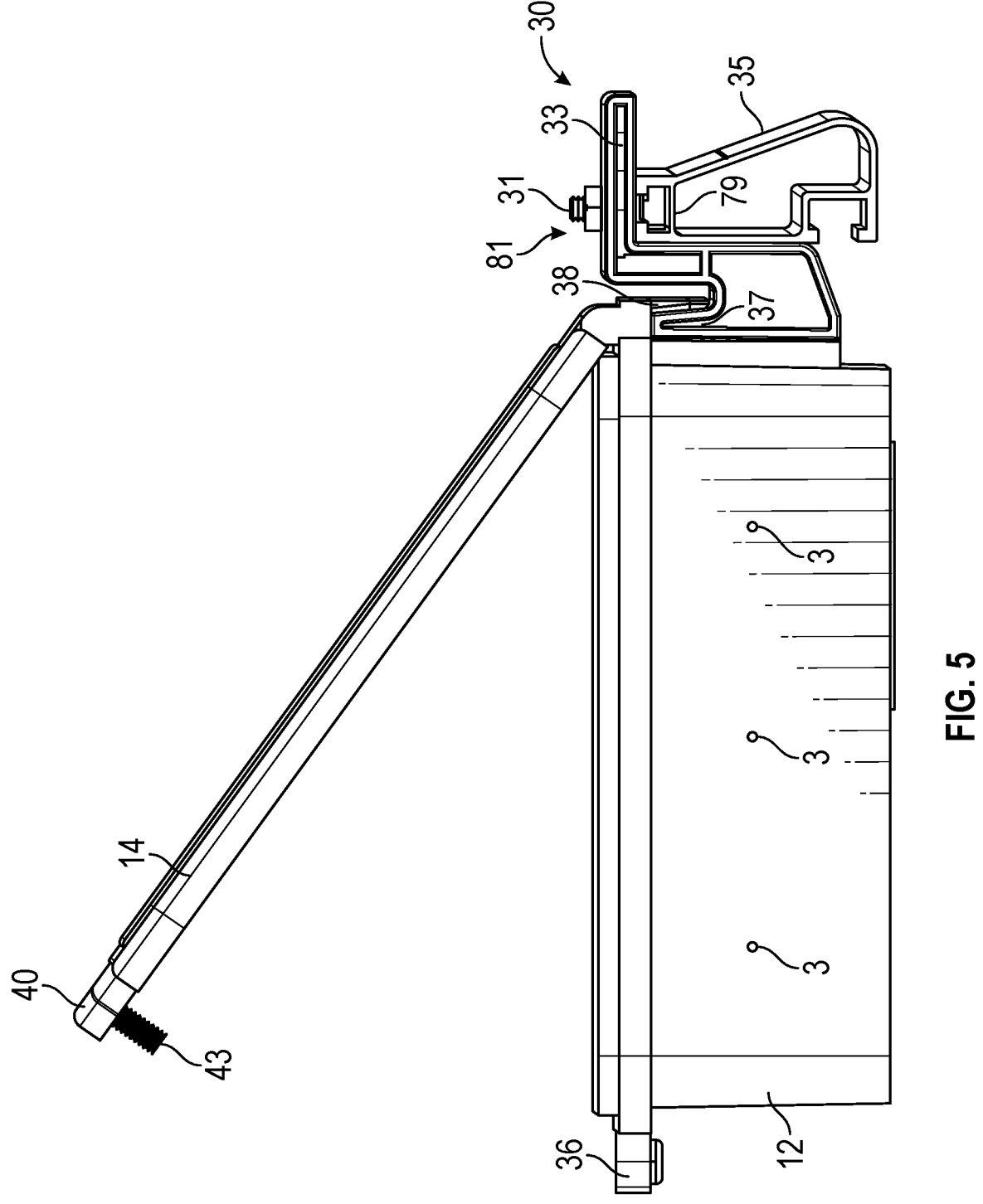
FIG. 5 is another view of the present invention, illustrating a bracket, a lip, a lip fastener, a bracket clip, and additional elements according to one embodiment of the present invention.
Figure 6:
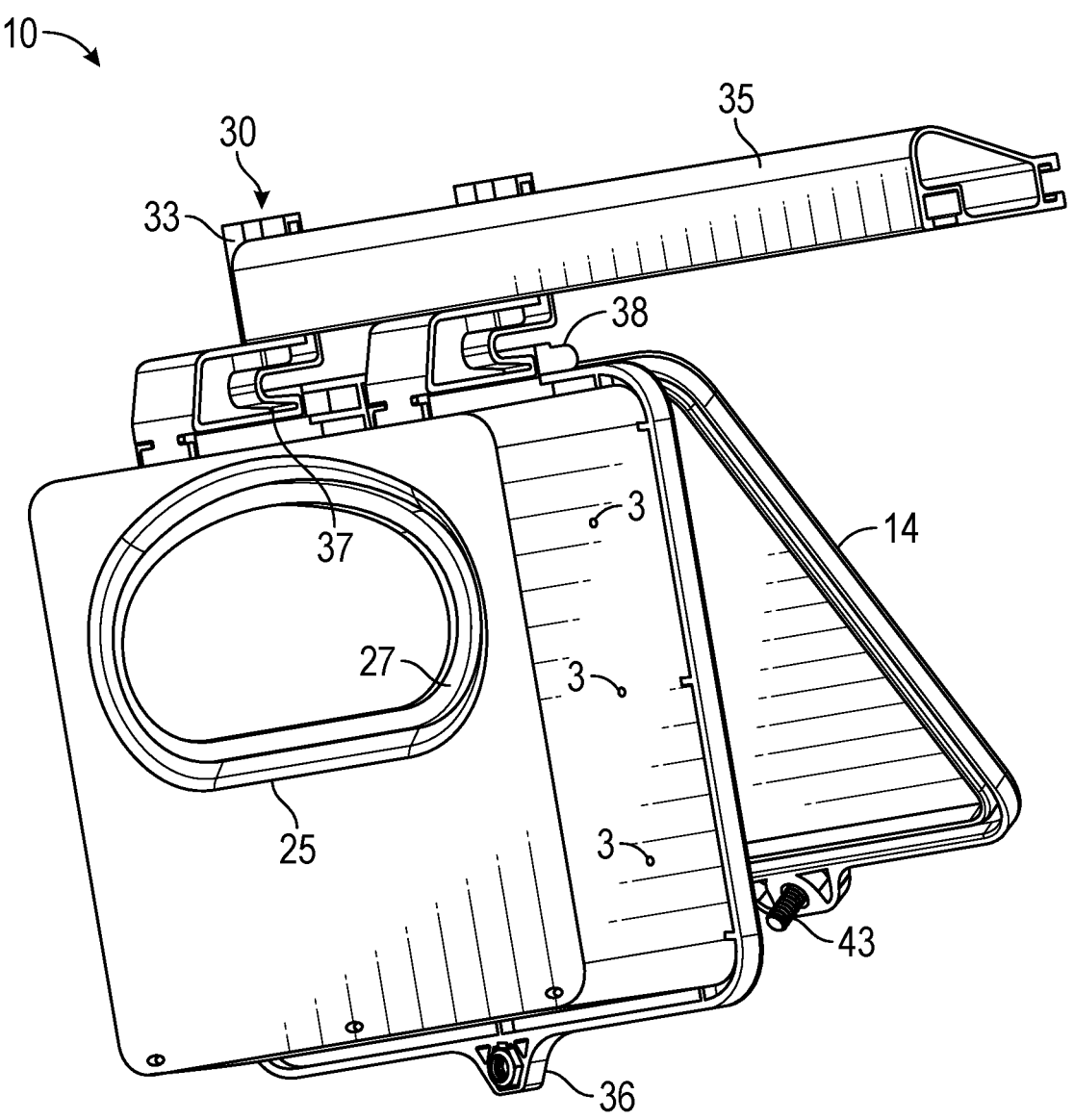
FIG. 6 is a bottom perspective view of the mountable junction box including the depression waterproofing indentation and the rubber seal according to one embodiment of the present invention.

As shown in FIG. 5, a bracket 30 (also referred to herein as "rail hanger") is configured to securely fasten the junction box via several elements that engage the junction box proximate to the hinge unit 18. The bracket 30 includes, in part, a lip fastener 31, bracket clip 37, tabs 38, and a lip 33, adapted for use with a variety of potential fittings including a rail 35 (i.e., solar mounting rail). As shown in FIGS. 4-6, the mountable junction box 10 contains waterproofing elements on its underside and can be configured to move between a locked position and an open position. In the locked or closed position, the housing unit lock screw 43 may extend beyond a surface of the enclosing unit 14. In the open position, the housing unit lock screw 43 may be positioned flush or form a recess with the surface of the enclosing unit 14.

Figure 7B:
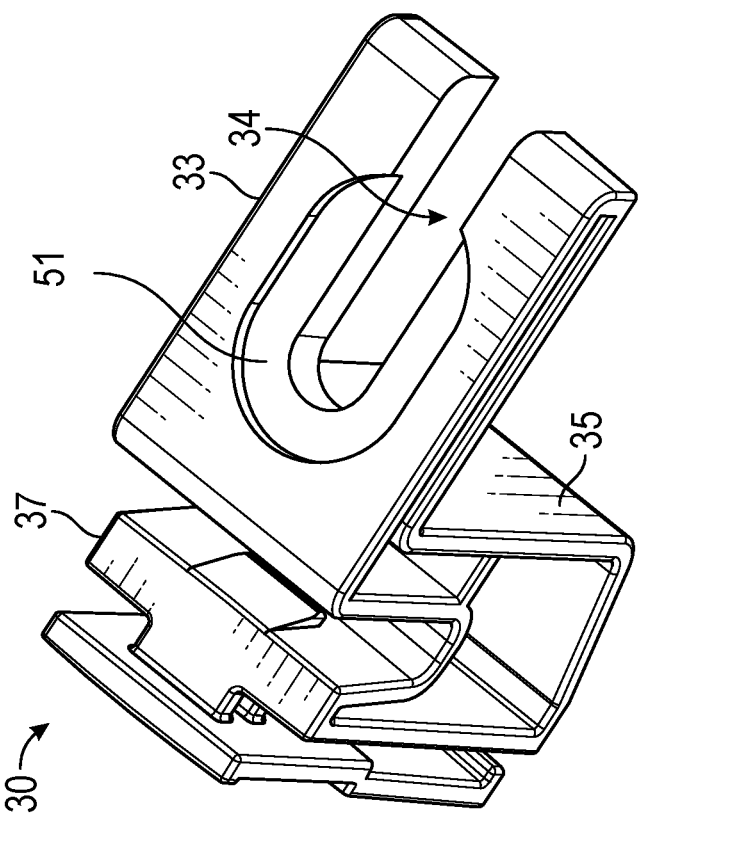
FIG. 7A and FIG. 7B show side and top perspective views, respectively, of the present invention, illustrating a cross-section of the rail, the bracket ("rail hanger"), the lip, the bracket clip, and additional elements according to one embodiment of the present invention.
Figure 7A:
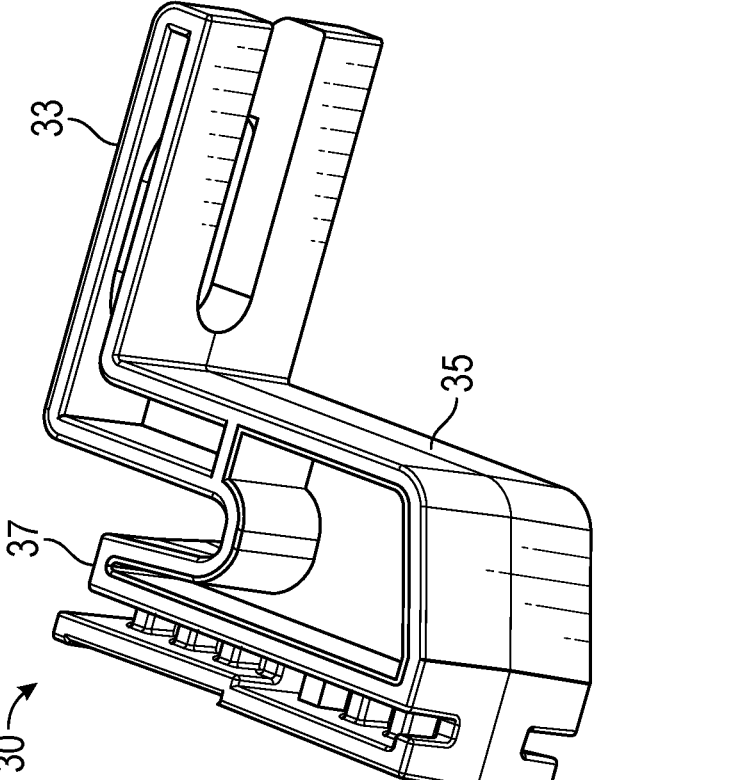

FIG. 7A and FIG. 7B show side and top perspective views, respectively, of the present invention, illustrating a cross-section of the bracket 30 ("rail hanger"), lip 33, bracket clip 37, and a double flanged retainer 34 with a depression area that provides a seating area 51 for lip fastener 31, which then inserts into a receiving track with one closed end. Various geometric configurations of the lip clamp 34 are contemplated, including the lip clamp ovular configuration displayed in FIG. 7B, which allows robust clamping to a rail 35 under a variety of weather conditions. Notably, in some embodiments, brackets 30 may be paired with multiple rails 35. For example, a bracket 30 may be reversibly attached to two rails, three rails, four rails, or five rails simultaneously in a single embodiment. Said rails may be stacked or arranged side-by-side according to various embodiments of the present invention.

Figure 8:
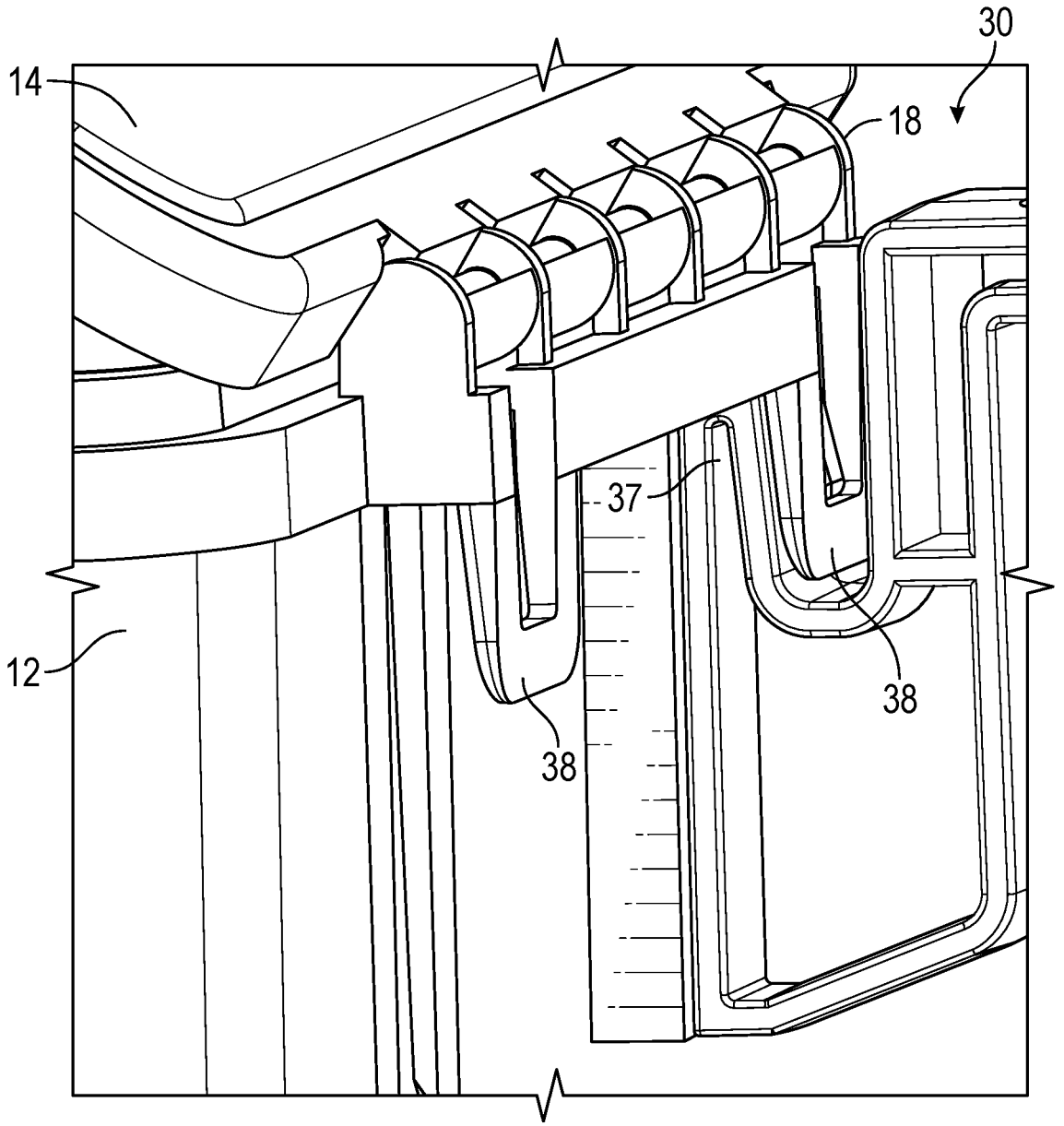
FIG. 8 is a perspective view of the mountable junction box including tabs that snap into the bracket clip of the bracket according to one embodiment of the present invention.

As shown in FIG. 8, the back of the junction box includes tabs 38 that snap into the bracket clip 37 of the bracket 30 where one tab 38 is shown without a bracket, and the other tab 38 is shown coupled to a bracket 30 for illustrative purposes. In use, the tab 38 deforms as the clip 37 is pushed upward between the tab 38 and the exterior side of the housing unit 12 and the two elements are locked together. Clip 37 has a projecting lip that snaps into an opening in the tab 38. In some embodiments, a user may utilize a decoupling tool to remove the clip 37 and tab 38, thereby permitting removable attachment of the bracket 30 and the mountable junction box.

Figure 9B:
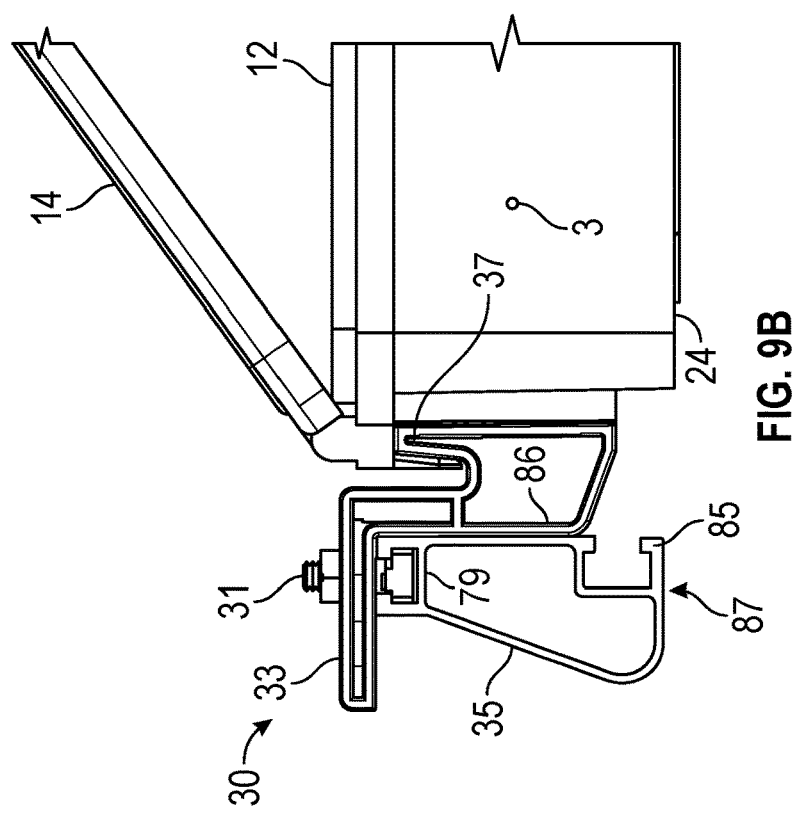
FIG. 9B shows a standard rail configuration wherein a bracket tooth is medium sized, and due to its longitudinal elongation extends beyond the proximate bracket wall according to one embodiment of the present invention.
Figure 9A:
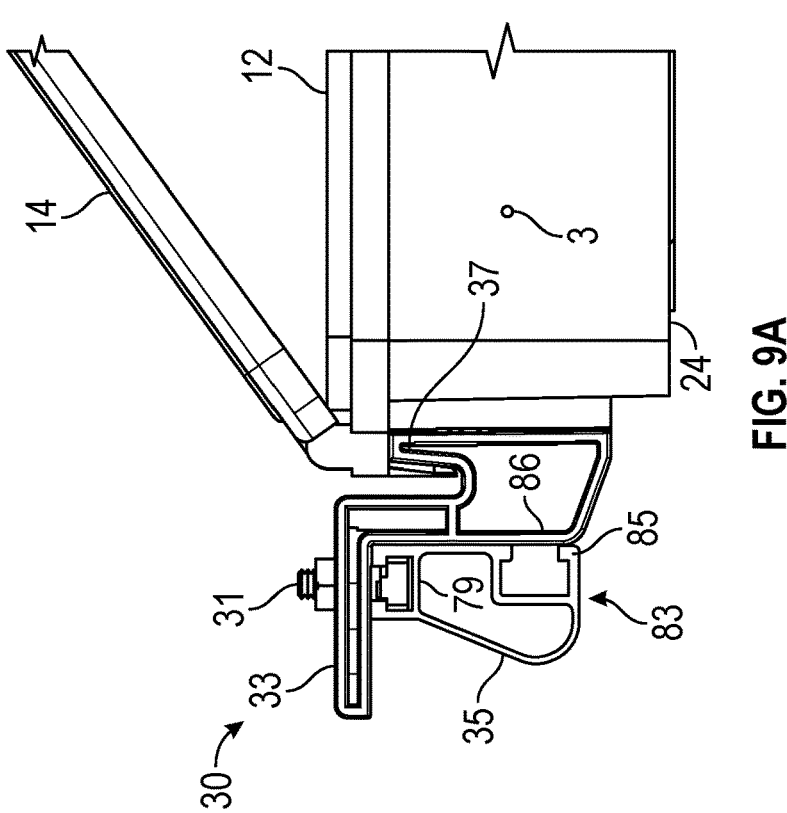
FIG. 9A shows a first rail configuration comprising a compacted rail wherein a bracket tooth is singular, medium sized, and oriented flush with the proximate bracket wall according to one embodiment of the present invention.

As shown in FIG. 5, FIG. 9A, FIG. 9B, FIG. 10A, and FIG. 10B each rail 35 includes a channel 79 into which a lip fastener 31 may be affixed or slid. The channel 79 may take on a variety of geometric configurations depending on the structural requirements of the system, the geometry of the lip fastener 31, and the like. In some embodiments, as shown in FIG. 5, a mating nut on the top side of the bracket secures the rail 35 to the bracket 30. In other embodiments, different rails 35 may attach to different brackets (rail hangers) 30. For example, as shown in FIG. 9A, in one embodiment a first rail configuration comprises a compacted rail 83 wherein the bracket tooth 85 is singular, medium sized, and oriented flush with the proximate bracket wall 86. As shown in FIG. 9B, in another embodiment a second rail configuration comprises a standard rail 87 wherein the bracket tooth 85 is medium sized, and due to its standard height extends beyond the proximate bracket wall 86 such that its distal end runs nearly parallel with the junction box 10 bottom surface 24.

Figure 10B:
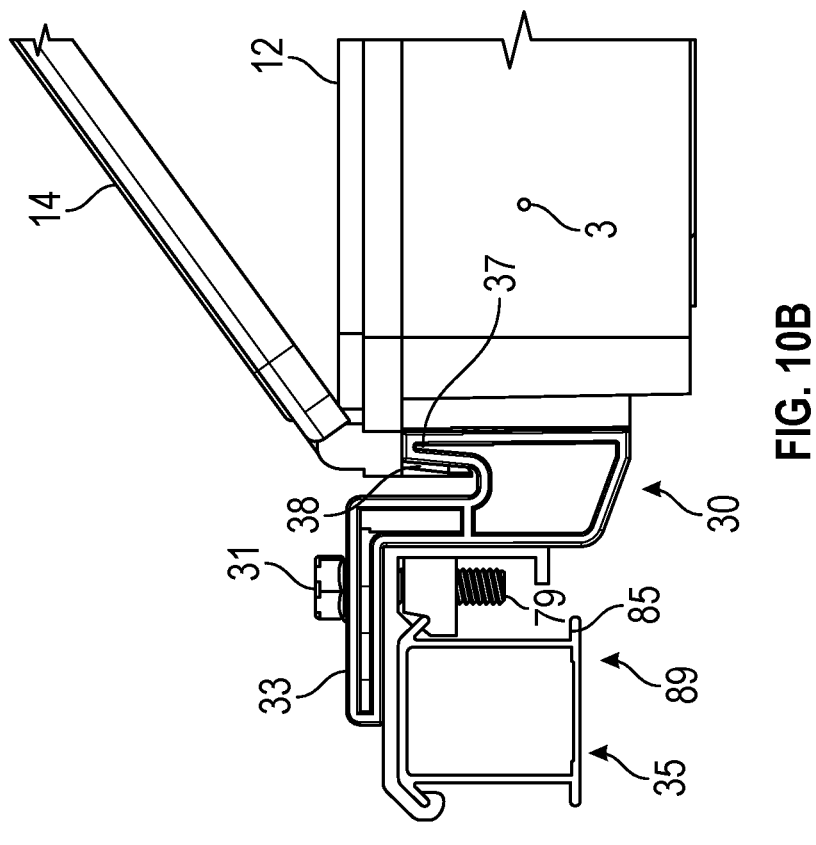
FIG. 10B shows a rectangular clip rail configuration according to one embodiment of the present invention.
Figure 10A:
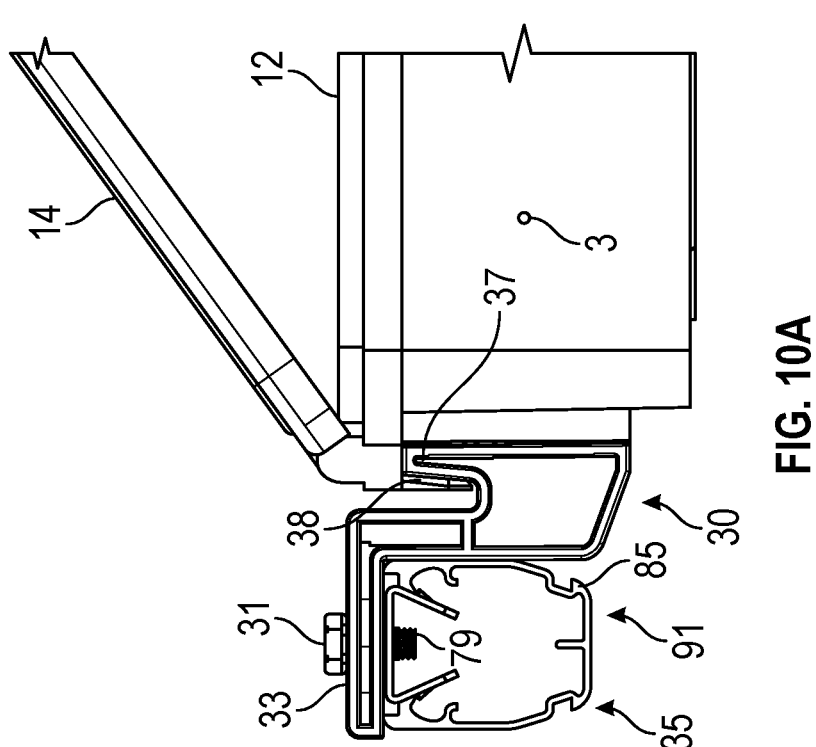
FIG. 10A illustrates a third rail configuration including a rounded clip rail with small bracket teeth and a lip fastener according to one embodiment of the present invention.

As shown in FIG. 10A, in another embodiment a third rail configuration comprises a rounded rail 91. As shown in FIG. 10B, in another embodiment a fourth rail configuration comprises a rectangular rail 89 wherein the bracket teeth 85 form the outer bottom edges of the rail. Finally, as described above, in some embodiments no rail is required to be attached the junction box to a roof 70 (i.e., by employing flashing 74 or via direct attachment to a flashing).

Figure 12:
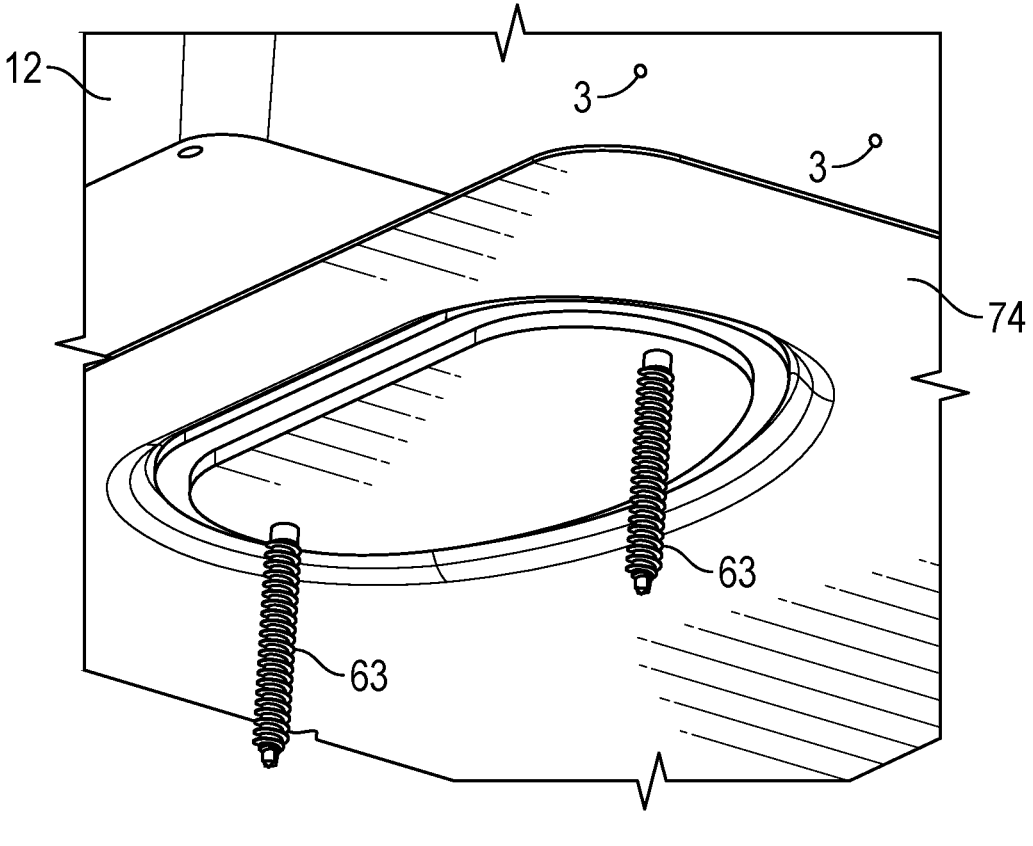
FIG. 12 shows a partial perspective bottom view of the present invention, illustrating the flashing, the fasteners, and the rubber seal elements according to one embodiment of the present invention.
Figure 13:
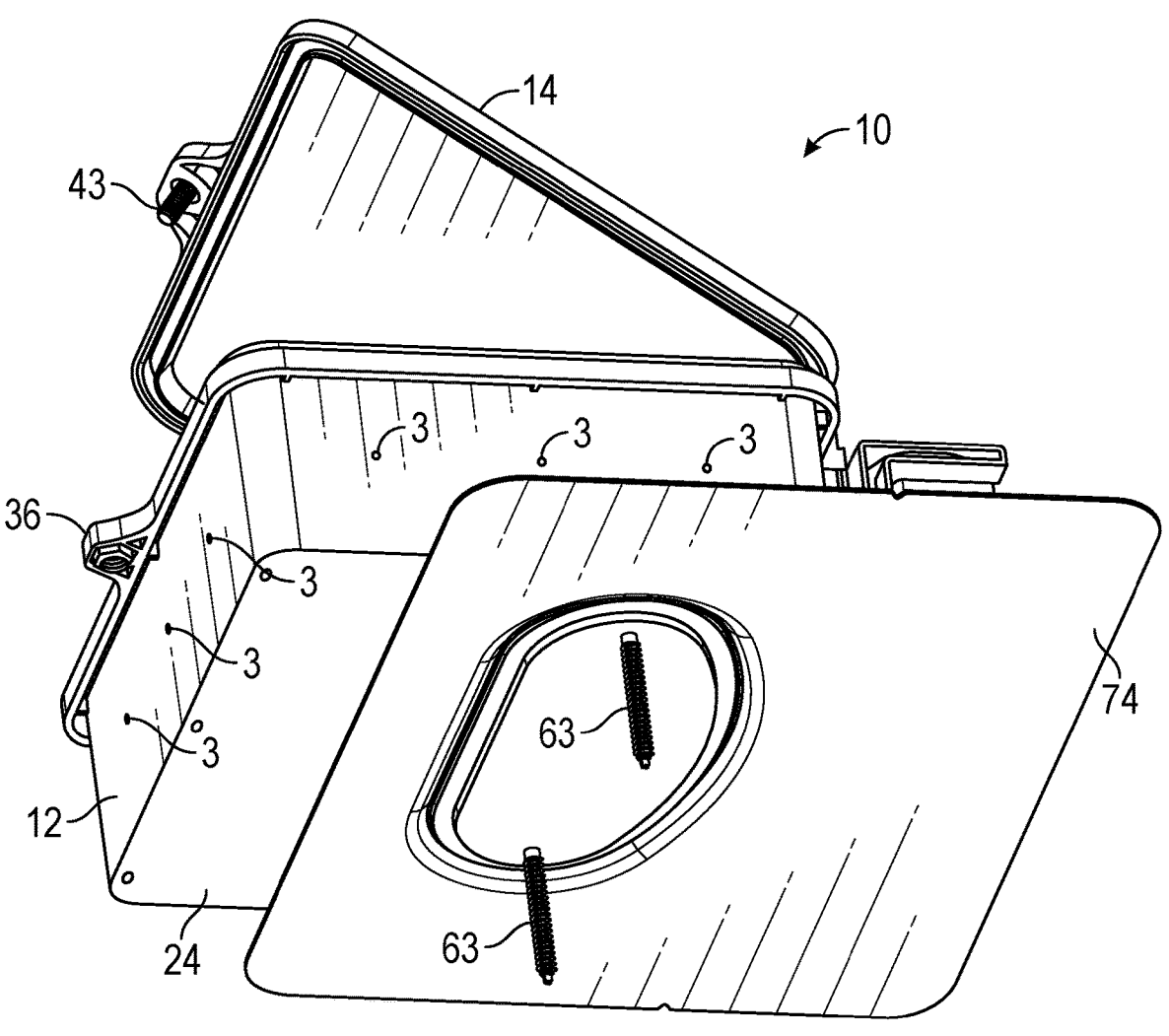
FIG. 13 illustrates an exploded view of the present invention, showing the enclosing unit, the housing unit, the flashing, the fasteners, and the sealing elements according to one embodiment of the present invention.
Figure 14:
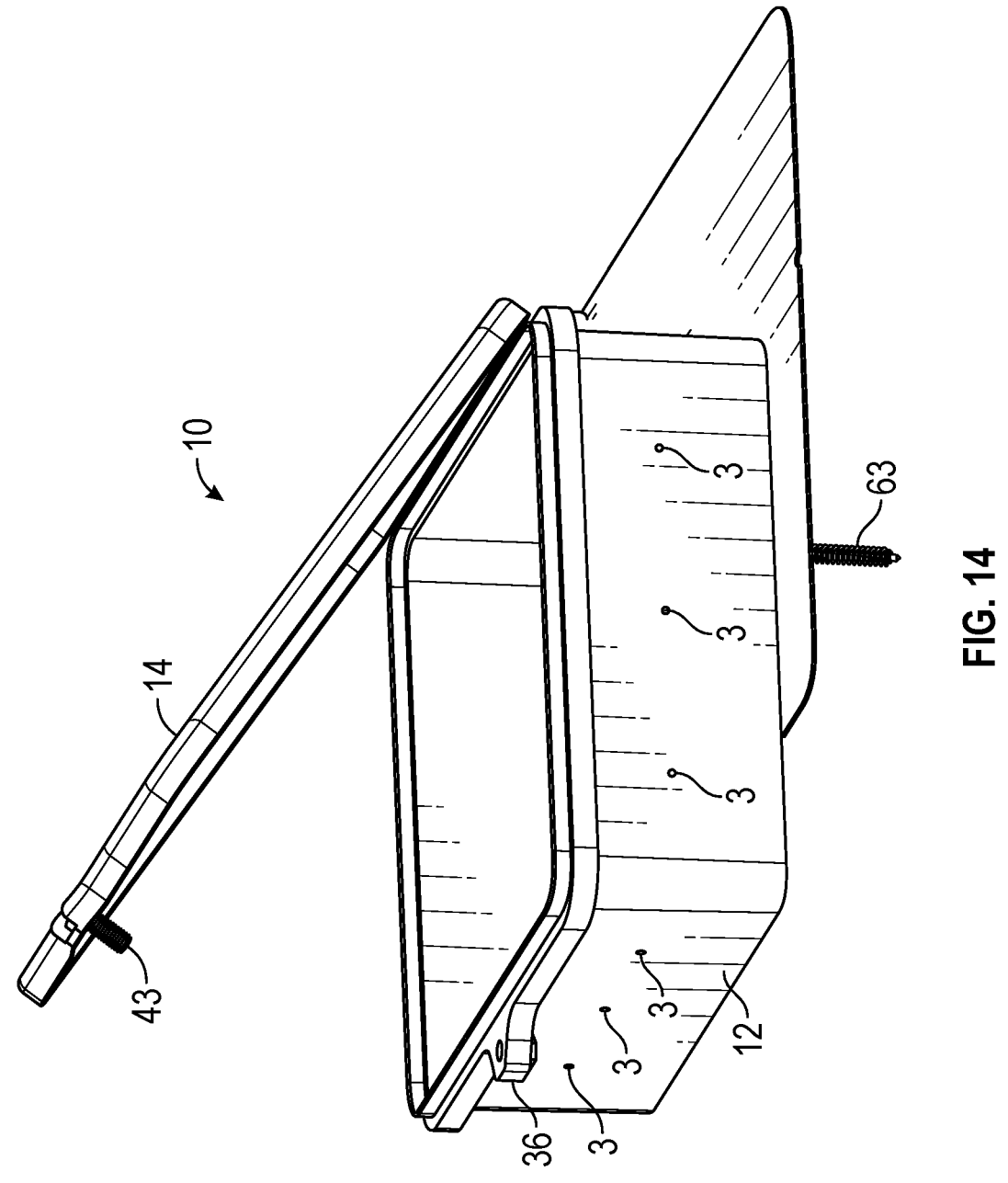
FIG. 14 shows an assembled side view of the present invention, showing the junction box of the present invention in an open configuration including an attached bracket, flashing, and fastener according to one embodiment of the present invention.

As described above, and as illustrated in FIGS. 11-14, in some embodiments junction box 10 is adapted to attach directly to a roof incorporating flashing 74. Specifically, flashing 74, continuous raised waterproofing track 45, and rubber seal element 27 combine to enable attachment of a junction box and similar devices to a roof in the absence of a bracket 30 and rail 35. Brackets 30 may be factory installed or supplied separately. In FIG. 14 the brackets 30 are absent and not required because the junction box is attached directly to the roof incorporating the flashing 74. In one example, flashing 74 attaches to the bottom surface 24 of a junction box when fasteners 63 are secured through fixation points 9 directly to a roof 70. When the housing unit 12 is installed on top of the flashing 74, as shown in FIG. 12 to FIG. 14, the rubber seal 27 is compressed between the top of the flashing continuous raised waterproofing track 45 and the junction box continuous waterproofing recess 25 to form a seal to prevent water infiltration into the roof.

The waterproofing zone 71 is defined by the mating of two separate tracks complimentary to one another. On the flashing 74 is a raised track that mates with an indentation on the bottom of the junction box 10, between which the rubber seal 27 is compressed. This area defined and surrounded by the seal creates a waterproofing zone 71 (see FIG. 18A) between the interior of the junction box and the building interior through the roofing that is protected from the external environment and wherein a screw, conduit, or other object that needs to pass through the roof may do so without compromising the integrity of the roof structure. In this way, the waterproofing zone provides a safe passageway or channel for wires to penetrate the roof without creating roofs leaks or water infiltration. At least one and potentially multiple pass throughs to the other side of the roof structure are present within the waterproofing zone. Larger solar arrays may require more wires, and if the capacity of the solar system requires multiple pathways of varying sizes from junction box to the roof interior, these may all be drilled through within the waterproofing zone 71.

The rubber seal 27 itself formed from a deformable gasket configured to prevent water seepage from the exterior environment into the interior environment below the roof 70. The rubber seal is preferably made from a compressible material impervious to water. While the seal may be made of rubber it is understood that any compressible waterproof material such as closed cell foam suitable to create a watertight seal when compressed may also be used. As described above and shown in FIG. 14, in an open configuration, the junction box assembly may comprise a bracket 30, flashing 74, fasteners 63, and additional elements described above such that a worker can secure the junction box to a roof and access wiring at the interior of the box. In some installation configurations, such as this instance where the junction box 10 is mounted on flashing, there is no need for the brackets 30 and they can be removed or simply not attached to avoid obstructions or as needed. The exterior of the vertical walls of the housing unit includes indents 3 which provide a guide and starting point for drilling holes for electrical ports 13.

Figure 15:
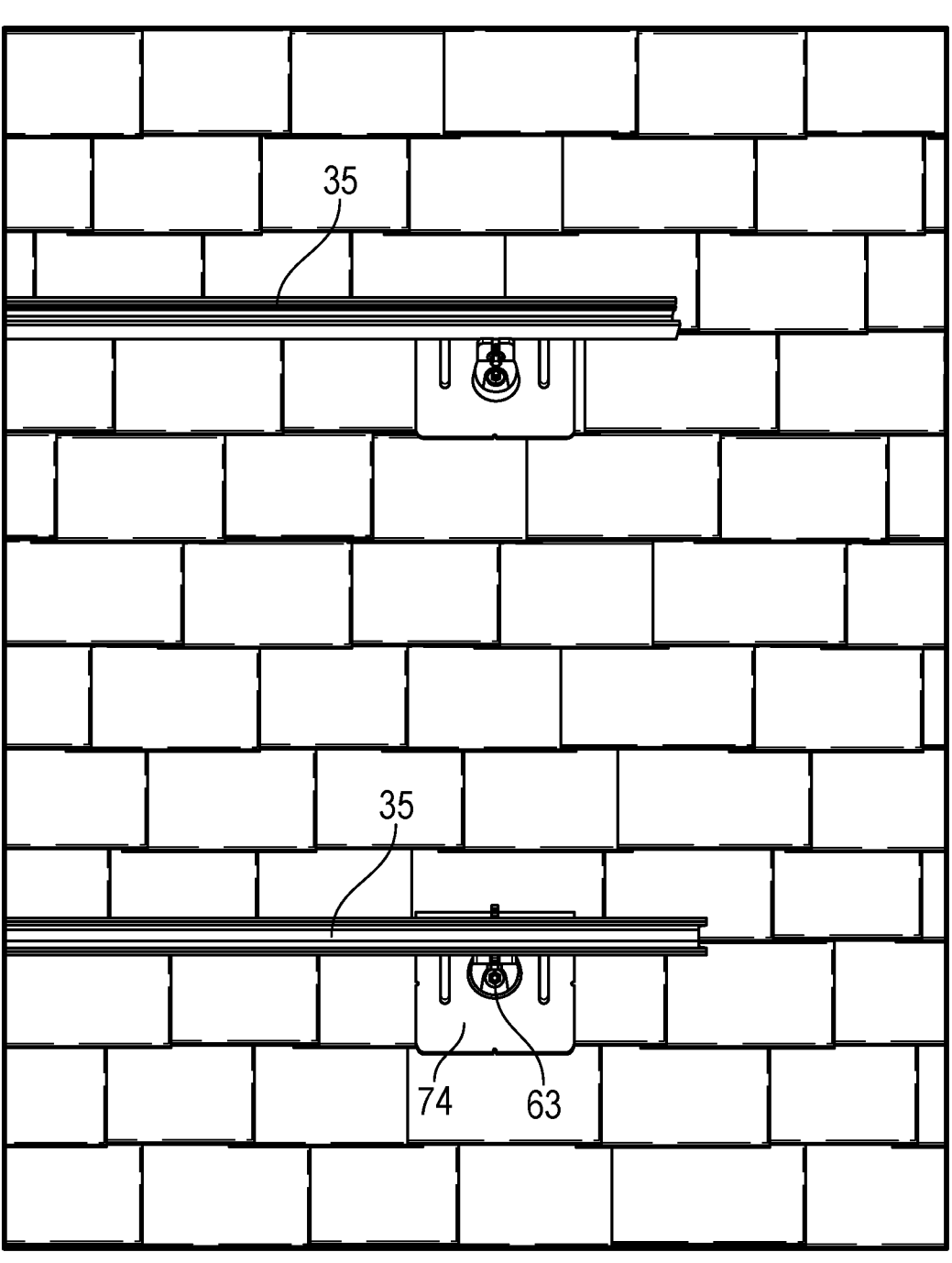
FIG. 15 shows an assembled view of part of the present invention, illustrating parallel assemblies including rails, flashing, fasteners, and additional elements according to one embodiment of the present invention.
Figure 16:
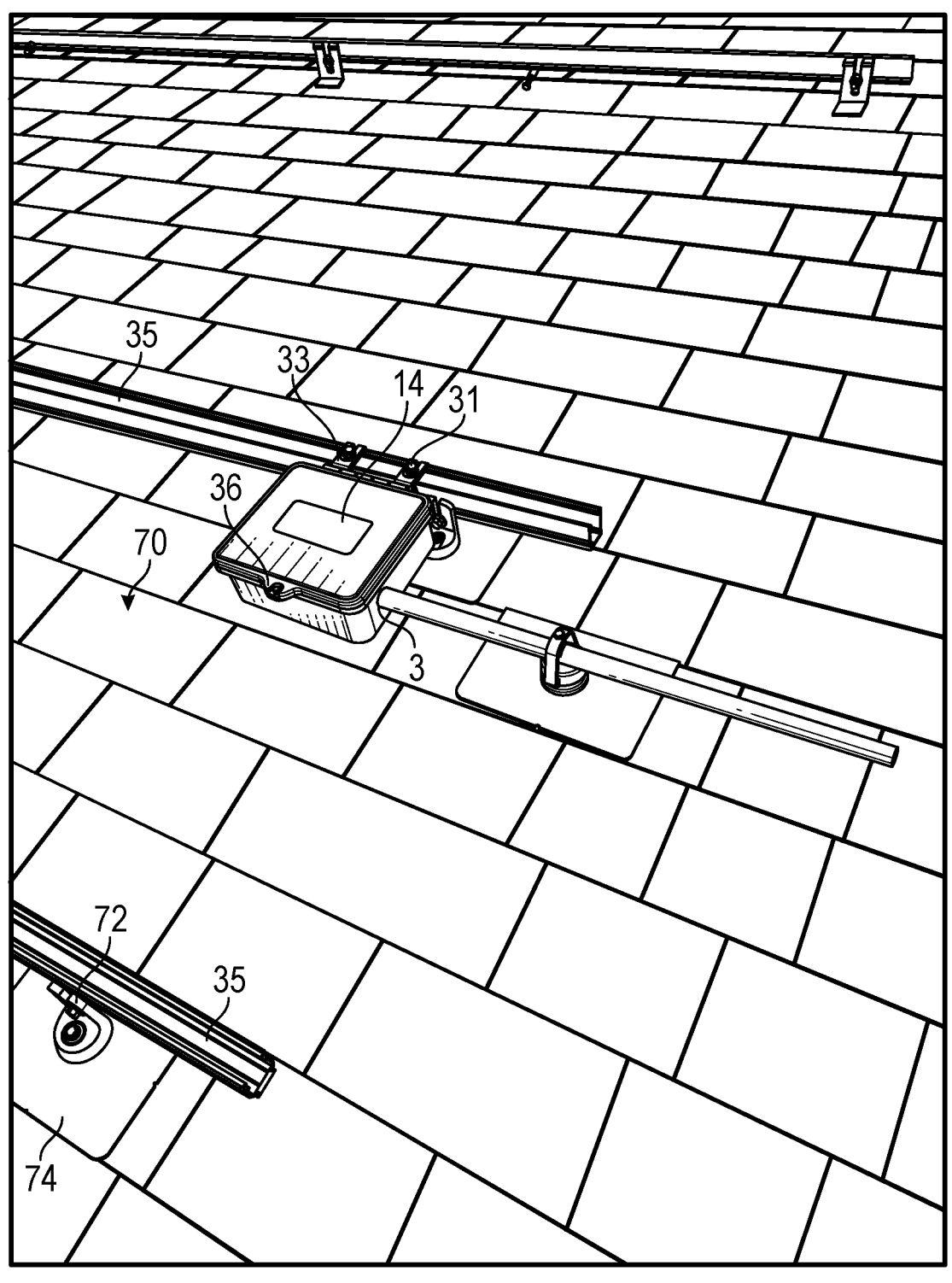
FIG. 16 is an exterior assembled perspective view of a mountable junction box with a parallel assembly of rails according to one embodiment of the present invention.
Figure 17B:
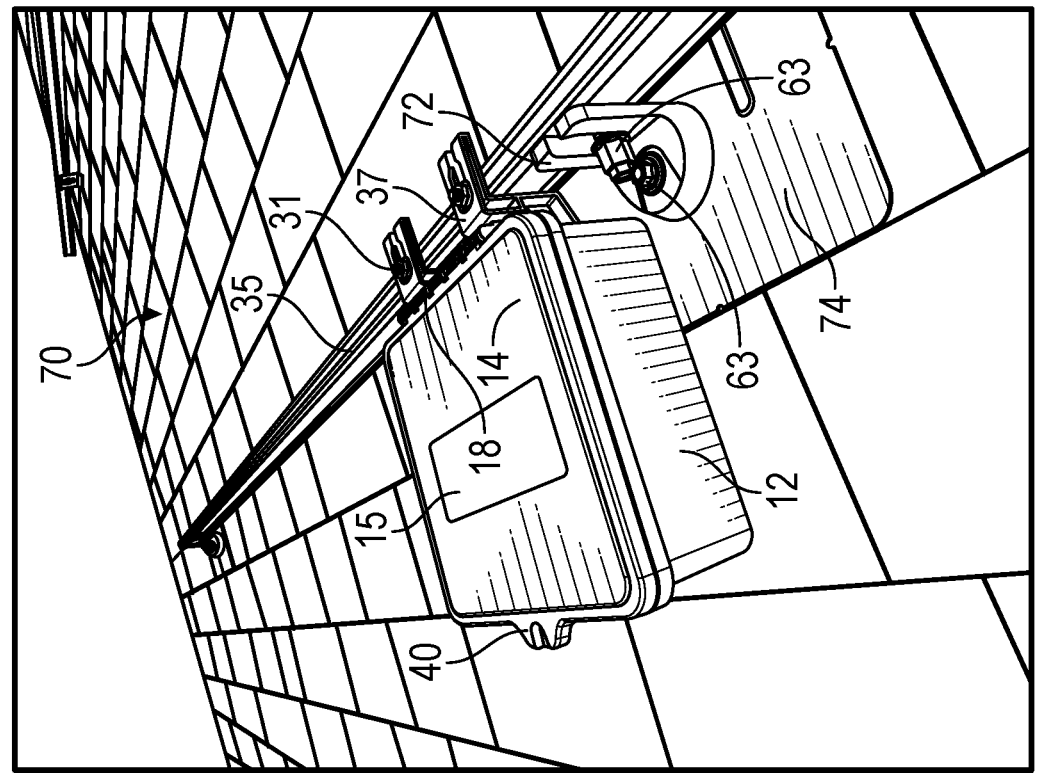
FIG. 17A and FIG. 17B show two views of the present invention (rotated by 180 degrees), illustrating a closed mountable junction box with viewable housing unit lock, enclosing unit, bracket elements, and additional elements according to one embodiment of the present invention.
Figure 17A:
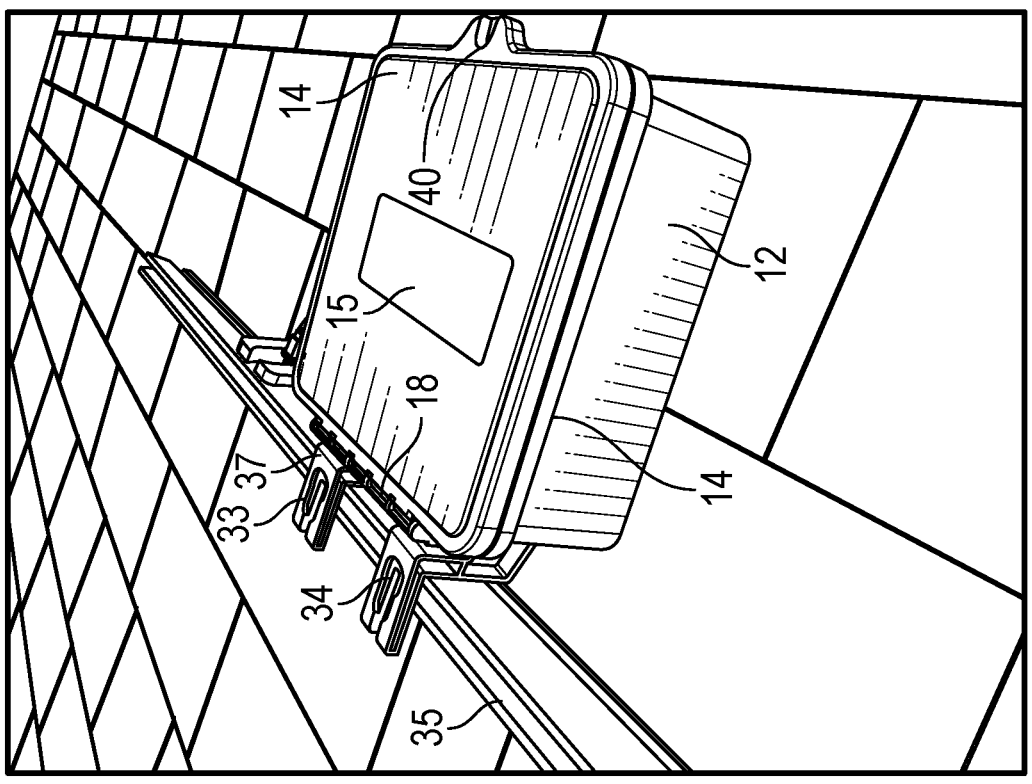
Figure 22:
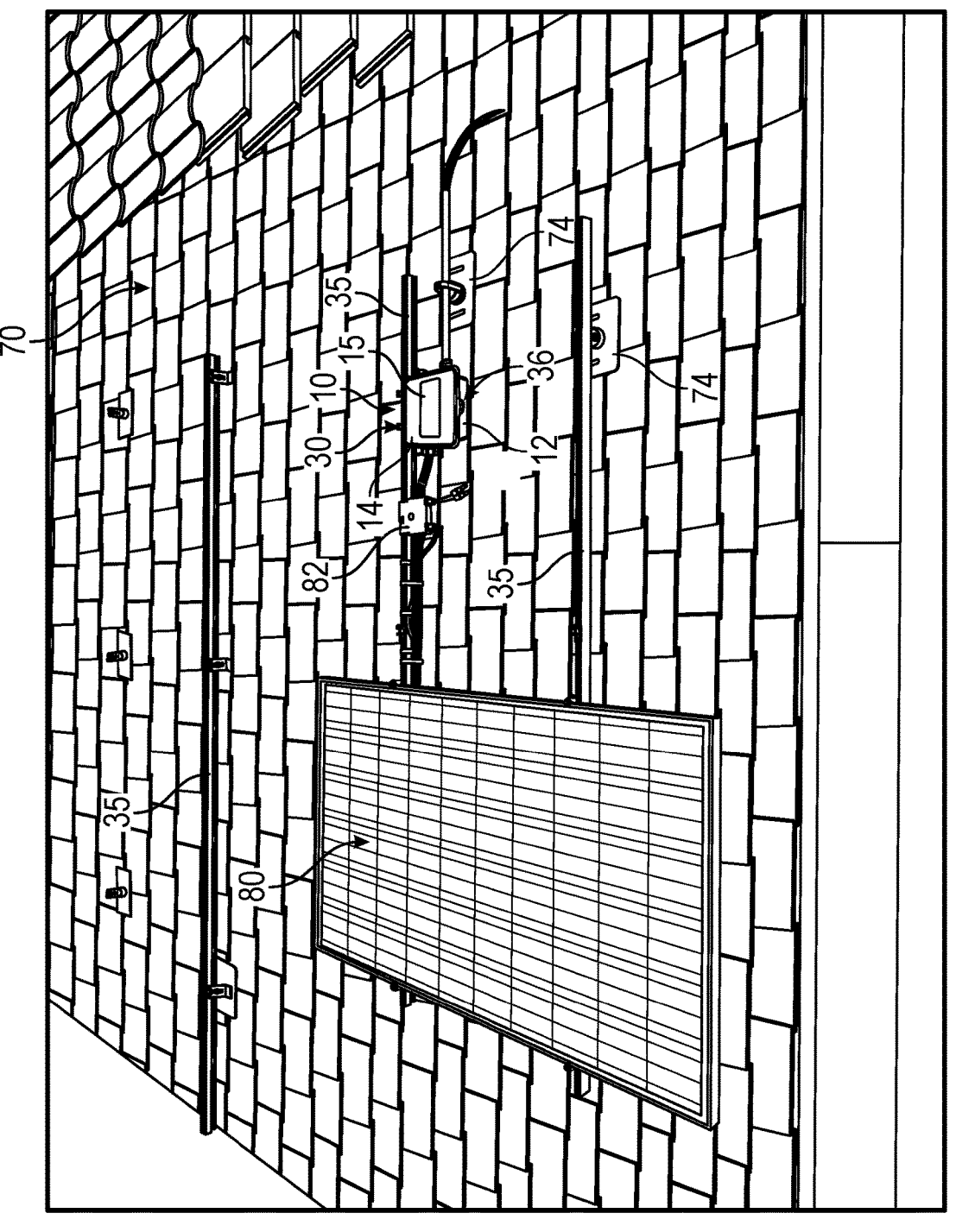
FIG. 22 shows a fully assembled solar panel-connected embodiment in the closed configuration with an electrical wiring routed from a solar panel to a solar panel electrical processing unit through the junction box according to one embodiment of the present invention.

FIG. 15 illustrates the environment on the roof showing the installation of the roof attachments and rails which support and secure solar panels to the roof. As described and shown, the junction box 10 can be installed to a variety of rails using the brackets 30 or installed directly to a roof incorporating the flashing 74. FIG. 16 shows a roof 70 with roof attachments, rails 35, a conduit mount and conduit attached through an electrical port 13 to the housing unit 12, and the junction box attached directly to the rail 35 in a closed configuration. FIG. 17A, FIG. 17B, and FIG. 22 show embodiments including closed mountable junction box assemblies with housing unit locks 36, enclosing units 14, bracket elements, and other related elements assembled in parallel with multiple rails 35 and/or solar panels 80. Similarly, FIG. 17A and FIG. 17B exemplify a closed embodiment of the junction box assembly installed on rails using brackets 30 in combination with lip fasteners and additional elements described above to secure the junction box to an exterior roof 70 in a locked, safe, and weatherproof manner.

As shown in FIG. 16 and FIG. 17B, a roof attachment bracket 72 provides securement of a rail 35 to flashing 74. As further shown in FIGS. 15-22, multiple rails 35 and accompanying junction boxes 10 may be secured to a roof in parallel, enabling a variety of arrangements, applications and electrical configurations. Similarly, in some embodiments, electrical wiring may be routed from solar panels 80 to a solar panel electrical processing unit 82 through the junction box 10 of the present invention.

Figures 18A, 18B:
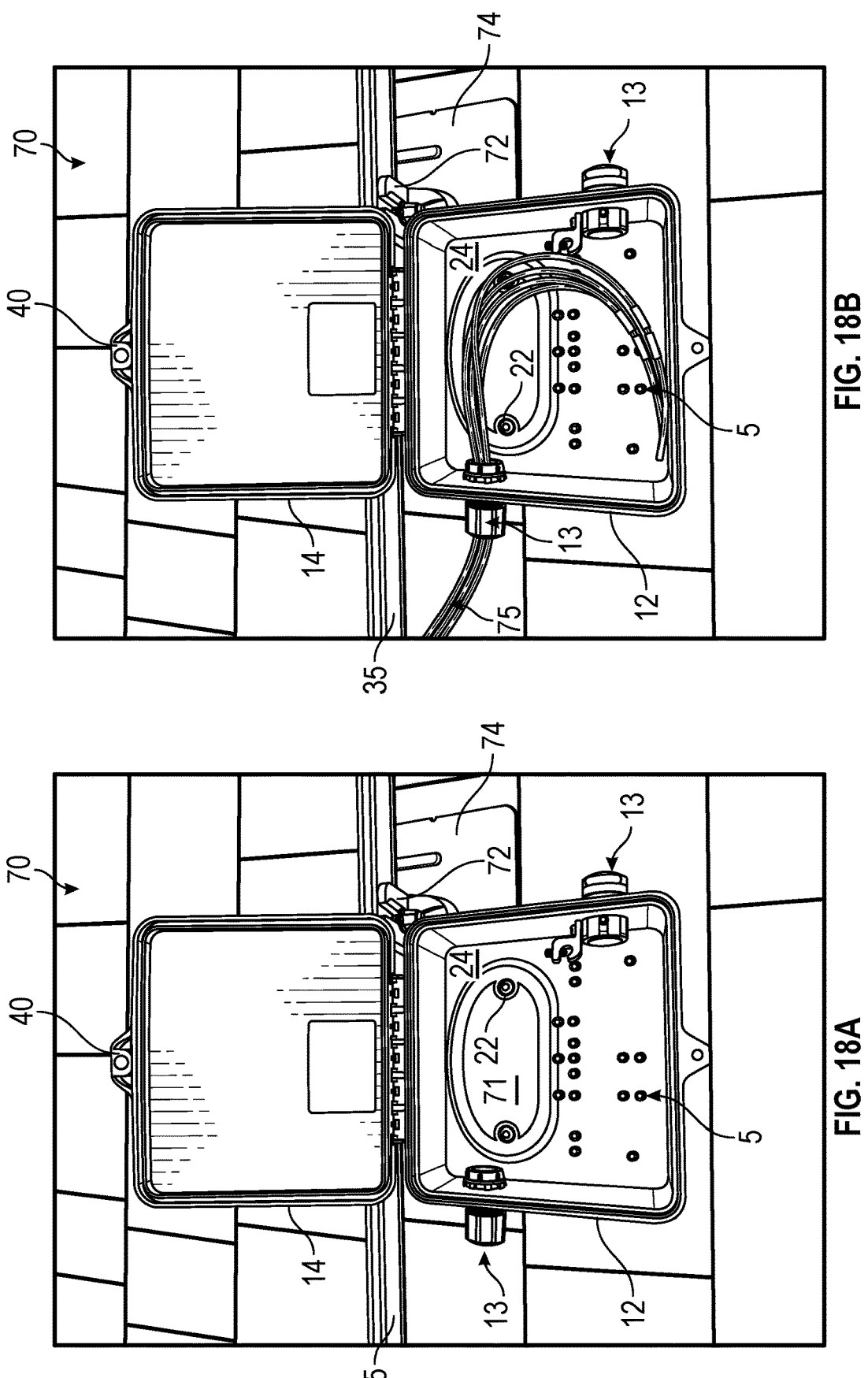
FIG. 18A and FIG. 18B show another view of the present invention, illustrating an open mountable junction box without wiring (FIG. 18A) and with partial wiring threaded through a port (FIG. 18B) according to one embodiment of the present invention.
Figure 19B:
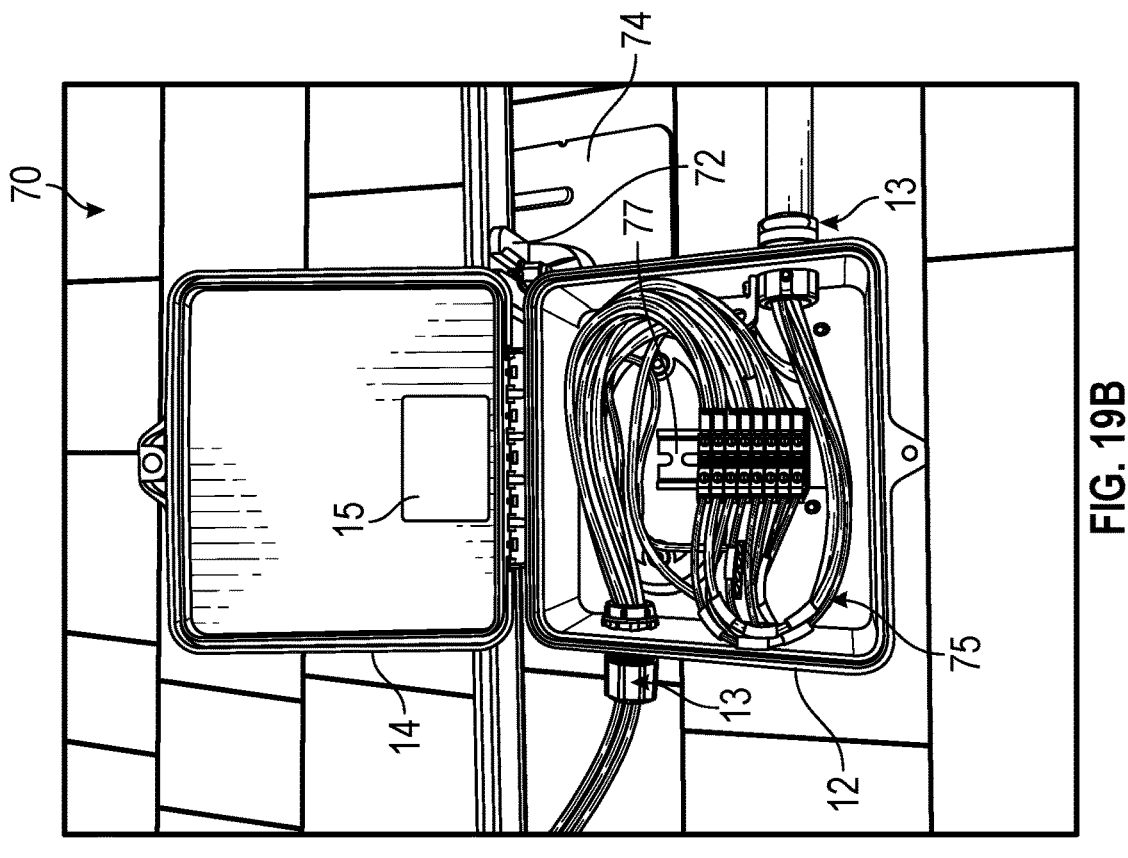
FIG. 19A and FIG. 19B show another view of the present invention, illustrating an open mountable junction box with full wiring (FIG. 19A) and with full wiring gathered into an interior wiring organizational unit (FIG. 19B) according to one embodiment of the present invention.
Figure 19A:
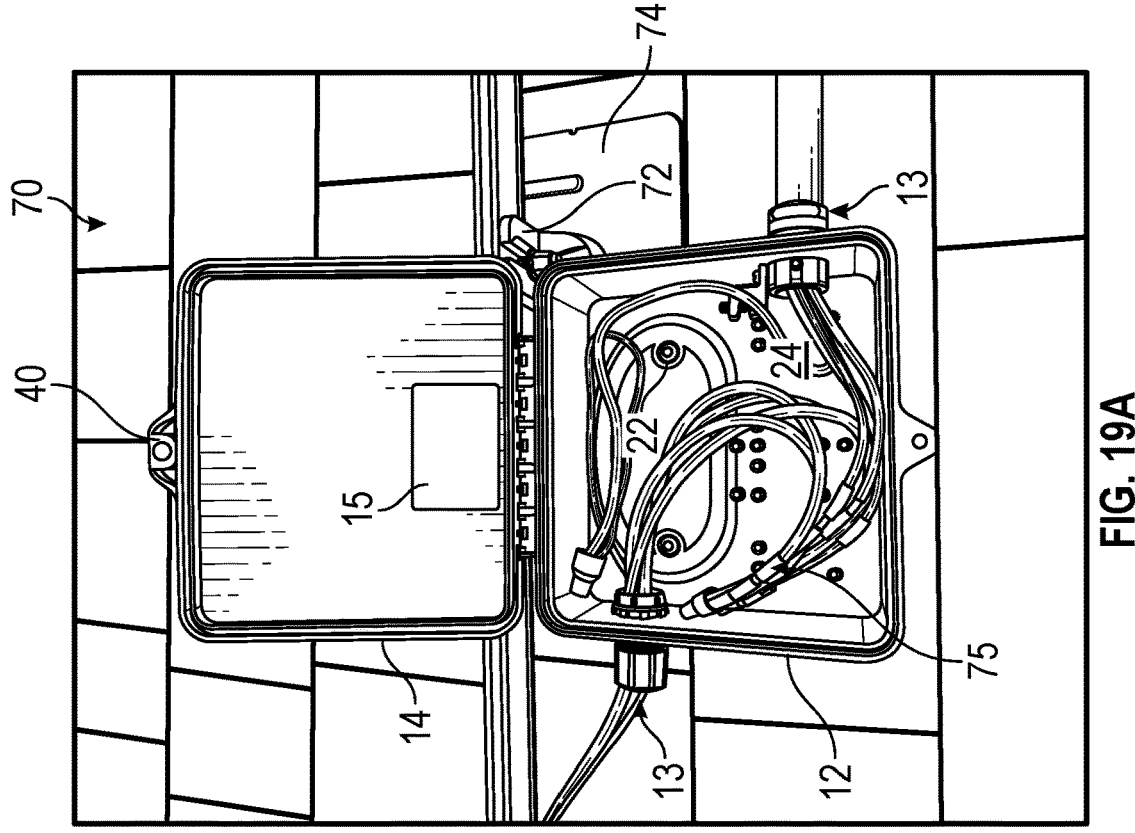
Figure 20:
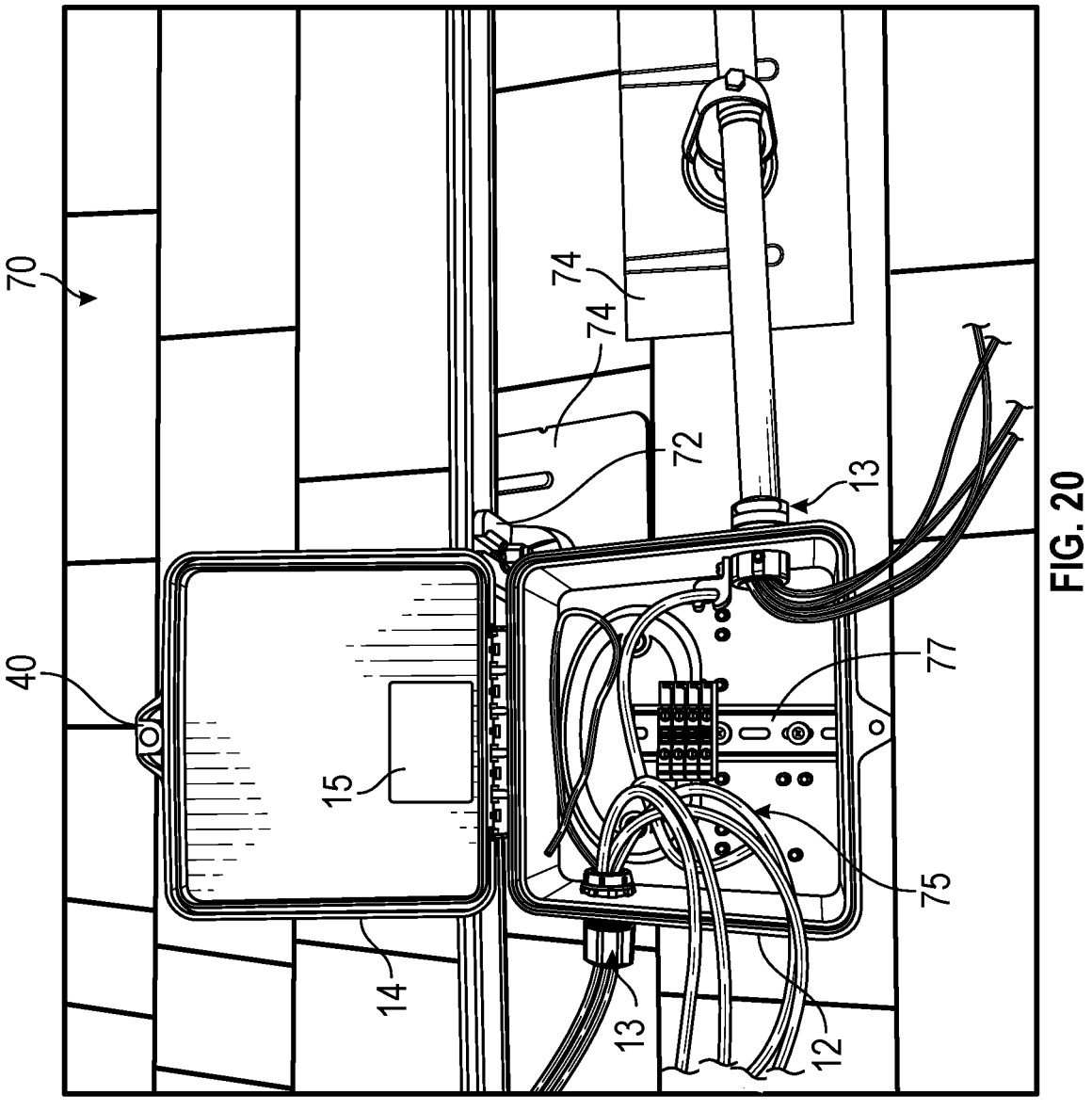
FIG. 20 shows another view of the mountable junction box illustrating an open mountable junction box with an electrical wiring exiting the secondary housing unit electrical port according to one embodiment of the present invention.

In some embodiments, as shown in FIG. 18A-FIG. 21, mountable junction box assemblies in the open configuration may be utilized to feed electrical wiring 75 into and out of the housing unit 12 through housing unit electrical ports 13. As shown in FIG. 18A and FIG. 18B, in some embodiments said electrical wiring may be configured to enter the housing unit 12 through the lateral side of the junction box proximal to the hinge unit 18 and feed out of the junction box 10 through a second housing unit electrical port 13 proximal to the housing unit lock 36, with all of said elements removably secured to a roof 70 via rails 35, flashing 74, and/or additional securement and waterproofing elements described above. In some embodiments, as shown in FIGS. 19A-20, mountable junction box assemblies in the open configuration may be further utilized to gather electrical wiring 75 into groups organized by charge and operably assembled across interior wiring organizational units 77 in combination with additional elements described above. FIG. 20 further shows that electrical wiring exiting a given junction box through a given housing unit electrical port 13 may be organized into piping that is itself removably secured to a roof 70 or the like by way of flashing 74.

Figure 21:
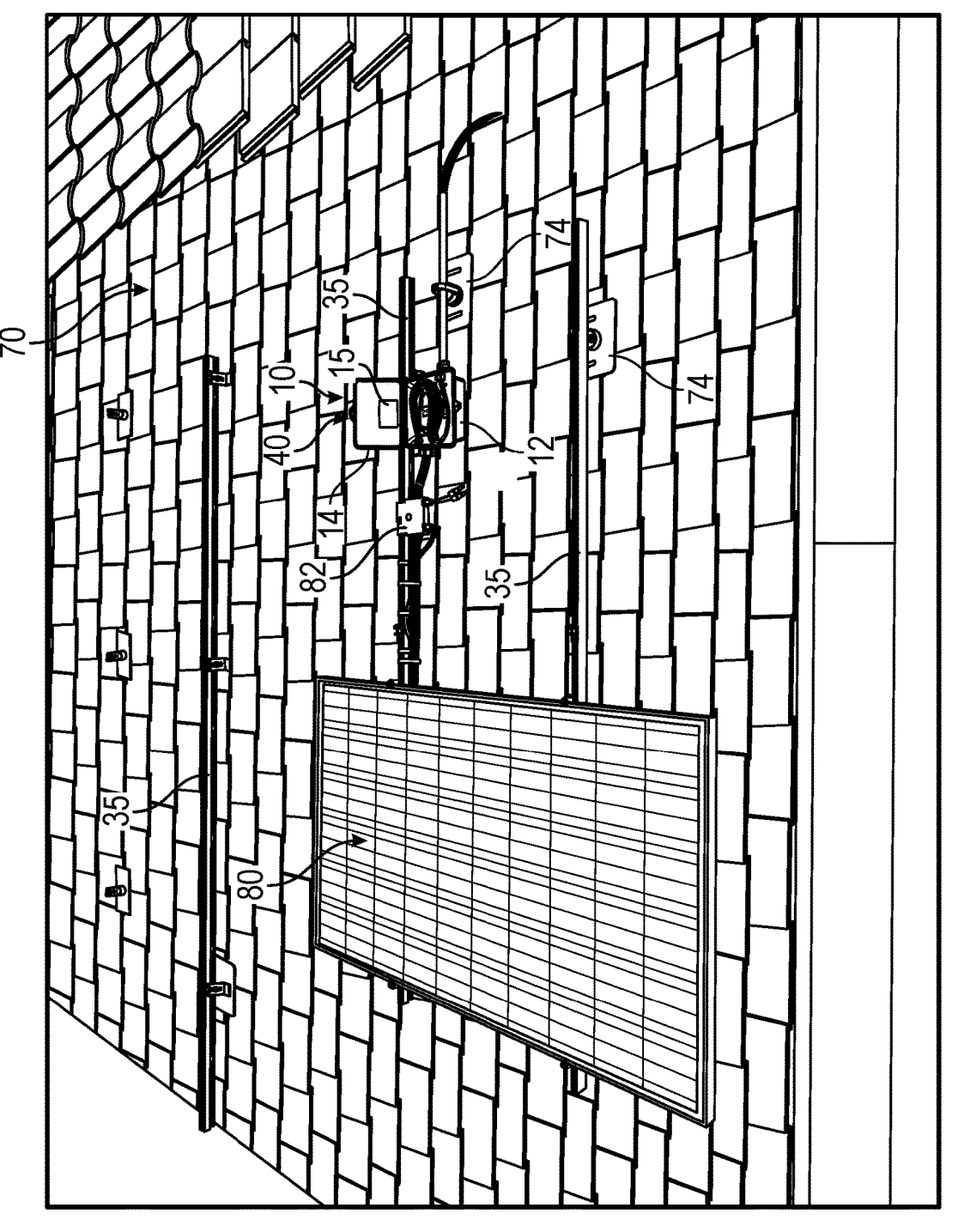
FIG. 21 shows a fully assembled solar panel-connected embodiment in the open configuration with an electrical wiring routed from a solar panel to a solar panel electrical processing unit through the junction box according to one embodiment of the present invention.

In fully assembled solar panel-supported embodiments, as shown in FIG. 21 and FIG. 22, electrical wiring may be routed from a solar panel 80 to a solar panel electrical processing unit 82 through the junction box 10, benefitting from weatherproof protection in the closed configuration (FIG. 22) while enabling ready access to the interior of the junction box in the open configuration (FIG. 21). As shown in FIG. 21 and FIG. 22, numerous elements described above may be assembled in parallel to provide an operable unit providing both robust securement to a roof 70 and the like, while enabling maintenance of the solar assembly by repairmen and users.

In still other embodiments, the present invention contemplates various conduit pass through and flashing connectivity features. For example, a configuration is contemplated wherein the housing unit 12 is attached directly to a flashing, rail or roof mount, and is positioned at least a first distance from a plurality of sidewalls ("panels") of the flashing, rail 35, or roof mount. In this example, the housing unit 12 may include a plurality of panels that form a plurality of borders, the plurality of borders including a first border formed by a first panel and a second panel that is oriented towards a first boundary of the flashing, rail, or roof mount. Further, the plurality of borders may encompass a bottom surface 24 that is attached to the plurality of panels and that defines a second depression including in one embodiment of a substantially similar diameter as a first depression and is substantially concentric with the first rectangular depression on a substantially parallel plane, the second rectangular depression indicating suitable hole positions in the bottom surface 24.

Figure 23:
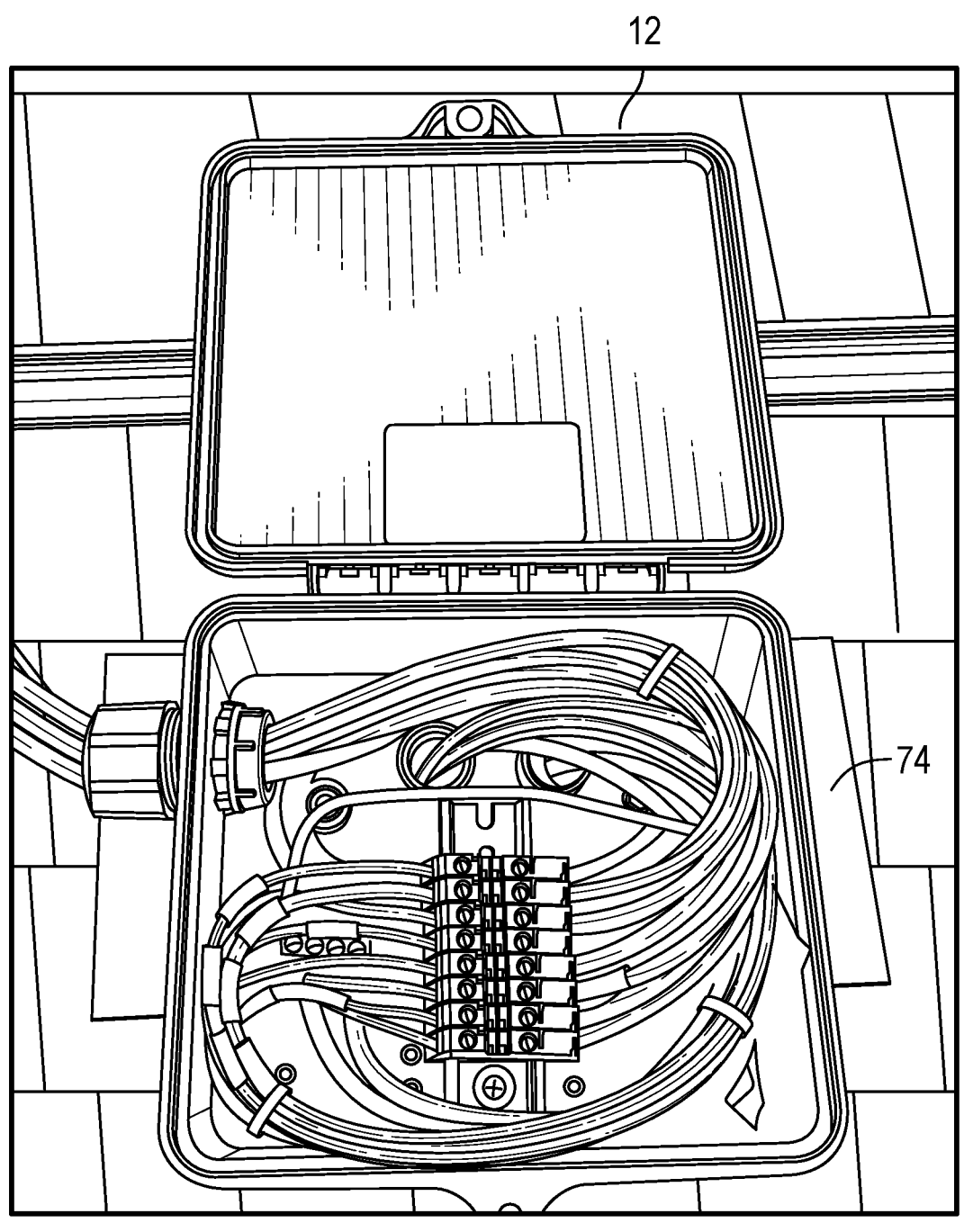
FIG. 23 shows a fully assembled solar panel-connected embodiment in the open configuration with an electrical wiring routed from a solar panel through the junction box and into the building interior through roof penetrations according to one embodiment of the present invention.

As described above, the housing unit 12 includes housing unit electrical ports to enable entry into the junction box of electrical wiring 75, such as is shown in FIG. 23. In some embodiments, the mountable junction box is adaptable to connect with at least one wiring and/or solar assembly of a building. In some embodiments, the electrical wiring 75 is gathered within the junction box in proximate rows by way of an interior wiring organizational unit or din rail 77 (FIG. 19B). In other embodiments, the housing unit 12 includes a plurality of exterior walls that form a plurality of borders, which may encompass a bottom surface that is attached to flashing 74. The bottom surface 24 may define a first depression 22 to indicate suitable screw hole positions in the bottom surface 24.

Figure 24:
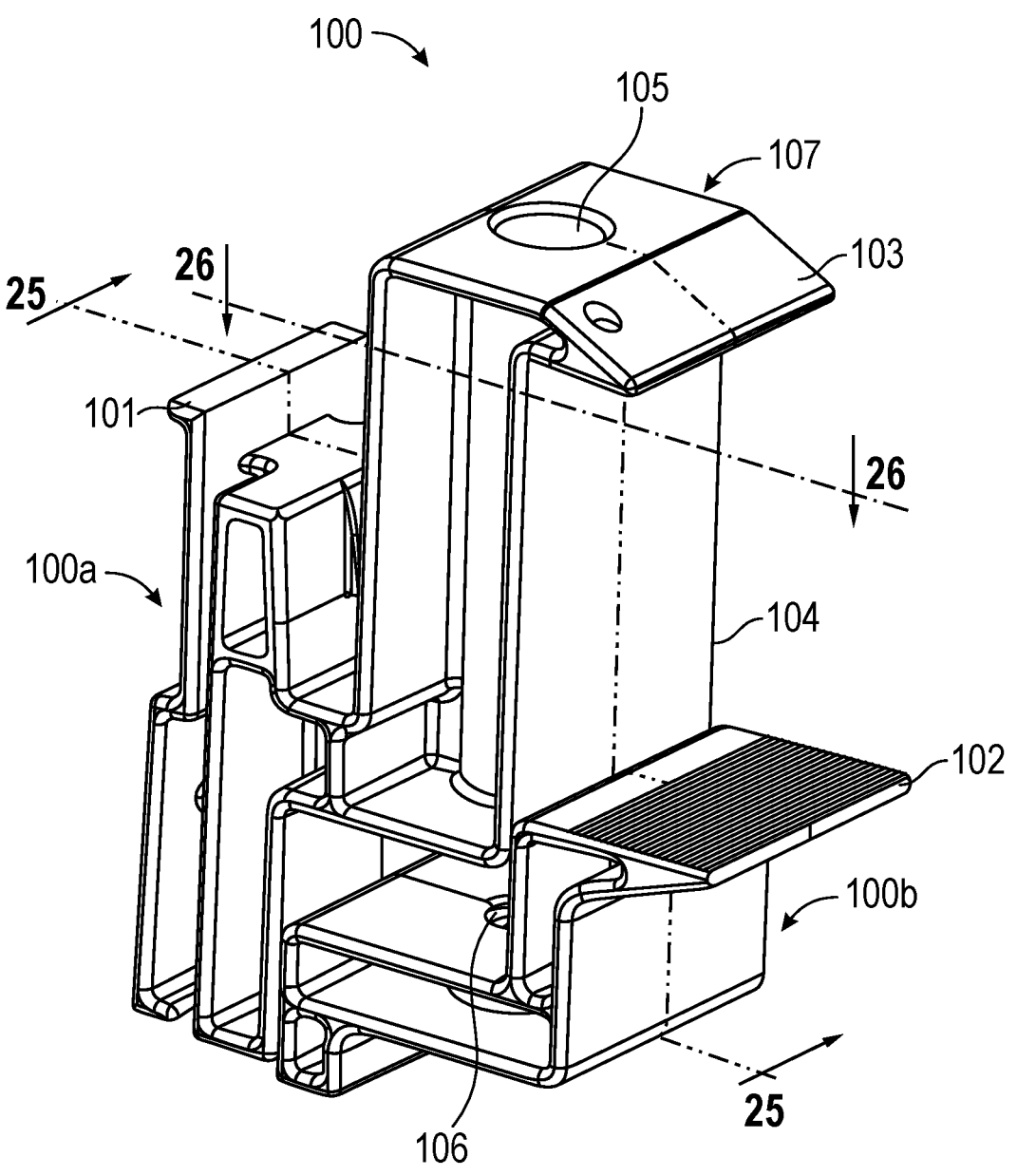
FIG. 24 shows a perspective view of a panel connection accessory configured to attach to the junction box according to an alternative embodiment of the present invention.

FIG. 24 shows a panel connection accessory 100 according to an alternative embodiment of the invention and adaptable to attach to the junction box 10. Here the accessory 100 is shown in a cast form and comprises a box attachment side including a clip 101 configured to snap onto the junction box 10 and a second accessory side 100b having an overhanging portion 103 acting as a top clamp for the module frame and a shelf 102 acting as a bottom clamping portion for the module frame. The entire assembly of top clamp 102 and bottom clamp 103 is referred to as clamping assembly 104.

Figure 25:
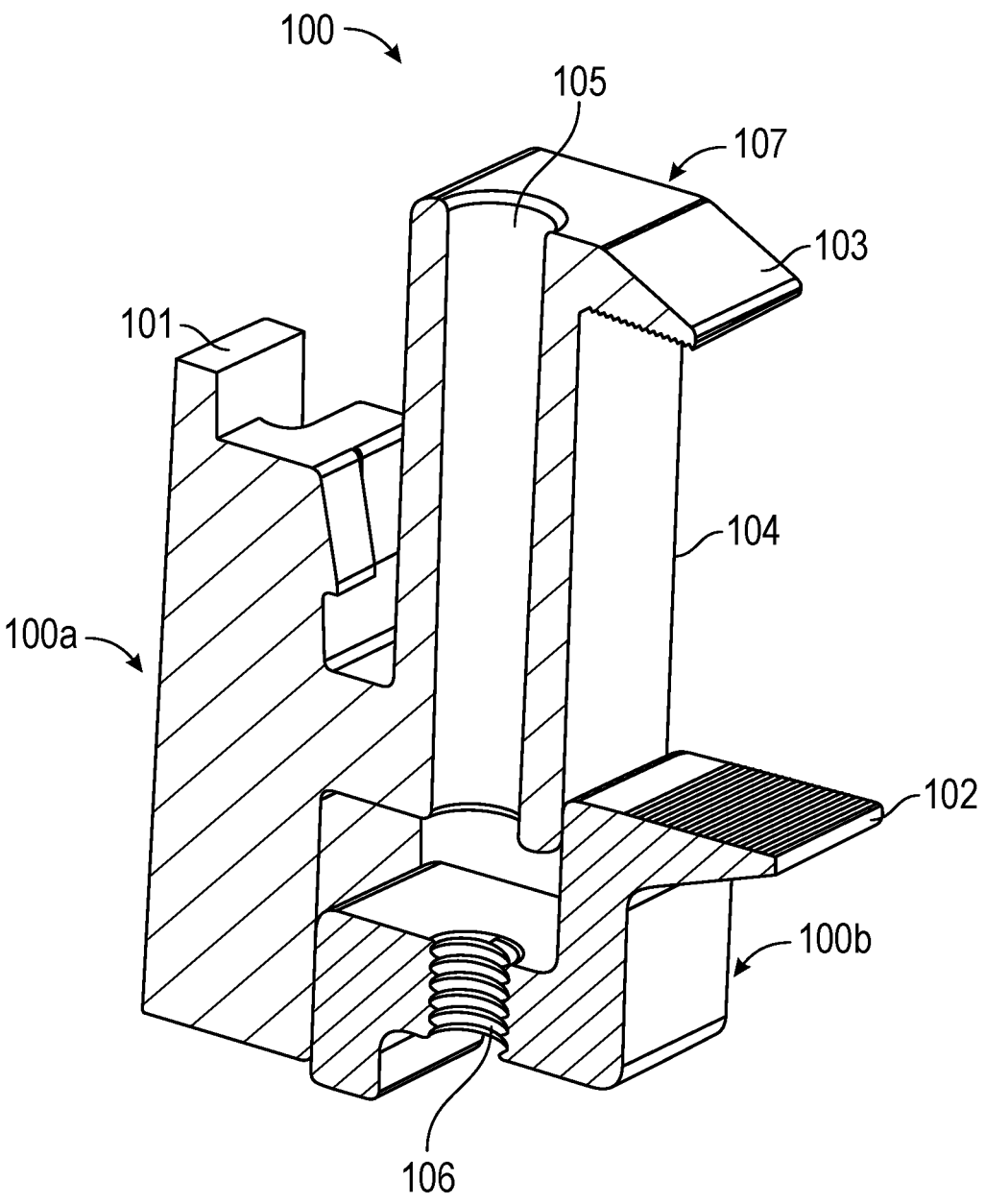
FIG. 25 shows a cross-sectional view of the panel connection accessory taken along line 25-25 of FIG. 24 illustrating a through-pass extending from a top portion of the panel connection accessory and leading to a threaded hole according to one embodiment of the present invention.

FIG. 25 is the same component shown bisected. Here, the through-pass 105 extending from a top portion 107 of the accessory 100 is shown, the through-pass leading to a threaded hole 106.

Figure 26:
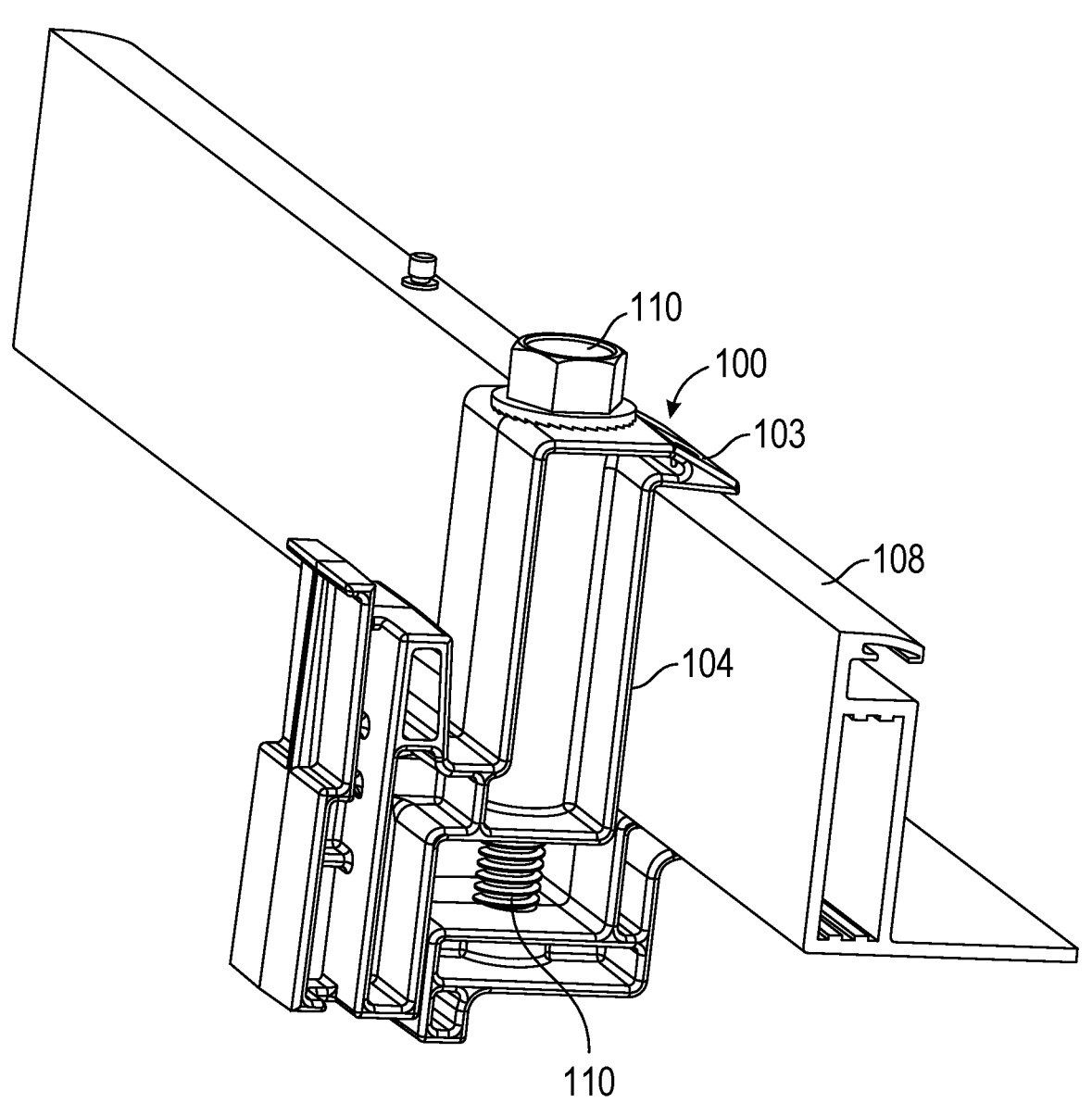
FIG. 26 is a perspective view of junction box attached to a solar panel rail according to an alternative embodiment of the invention.
Figure 27:
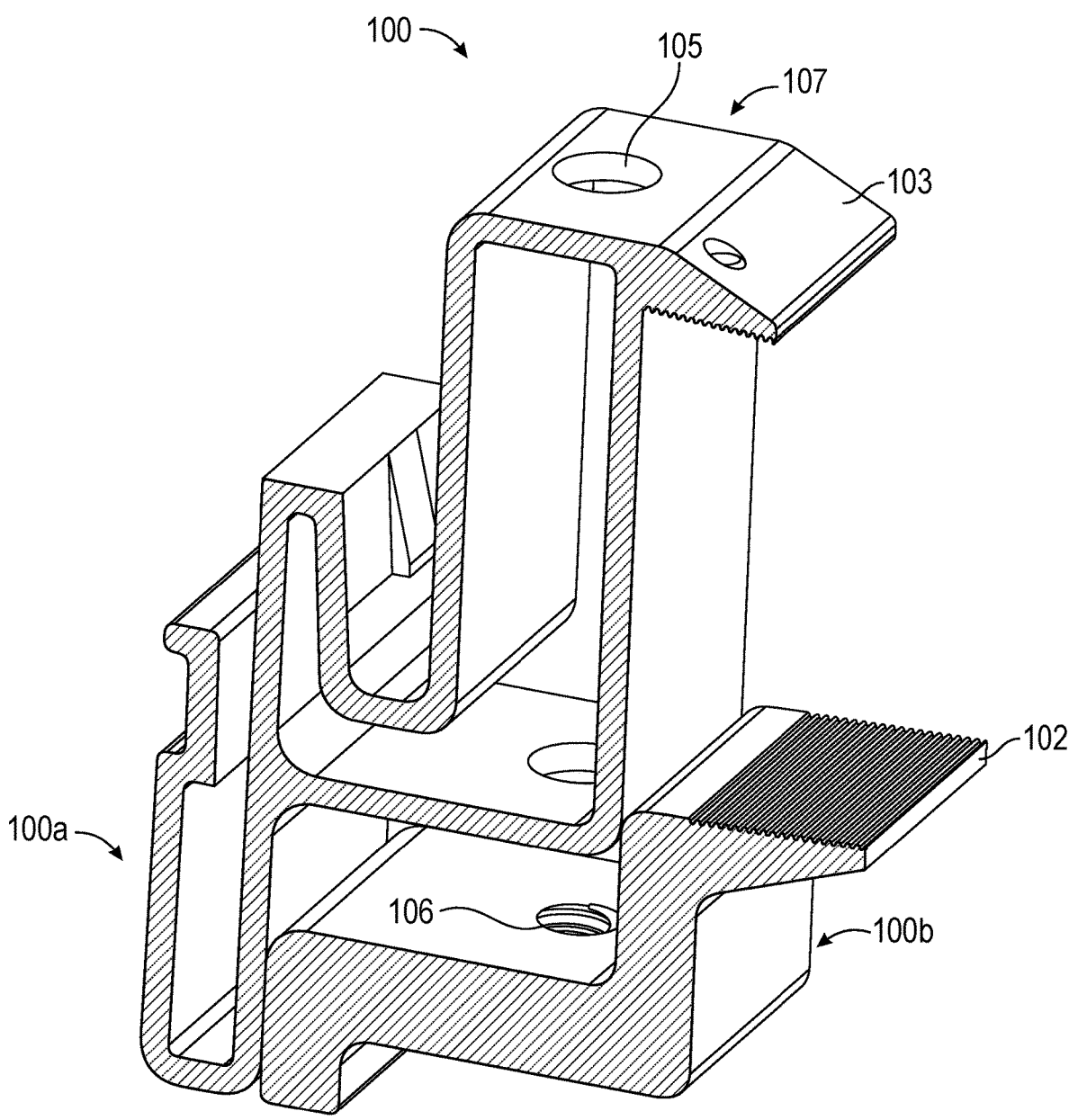
FIG. 27 shows a perspective view of a panel connection accessory configured to attach to the junction box according to a second alternative embodiment of the present invention.
Figure 28:
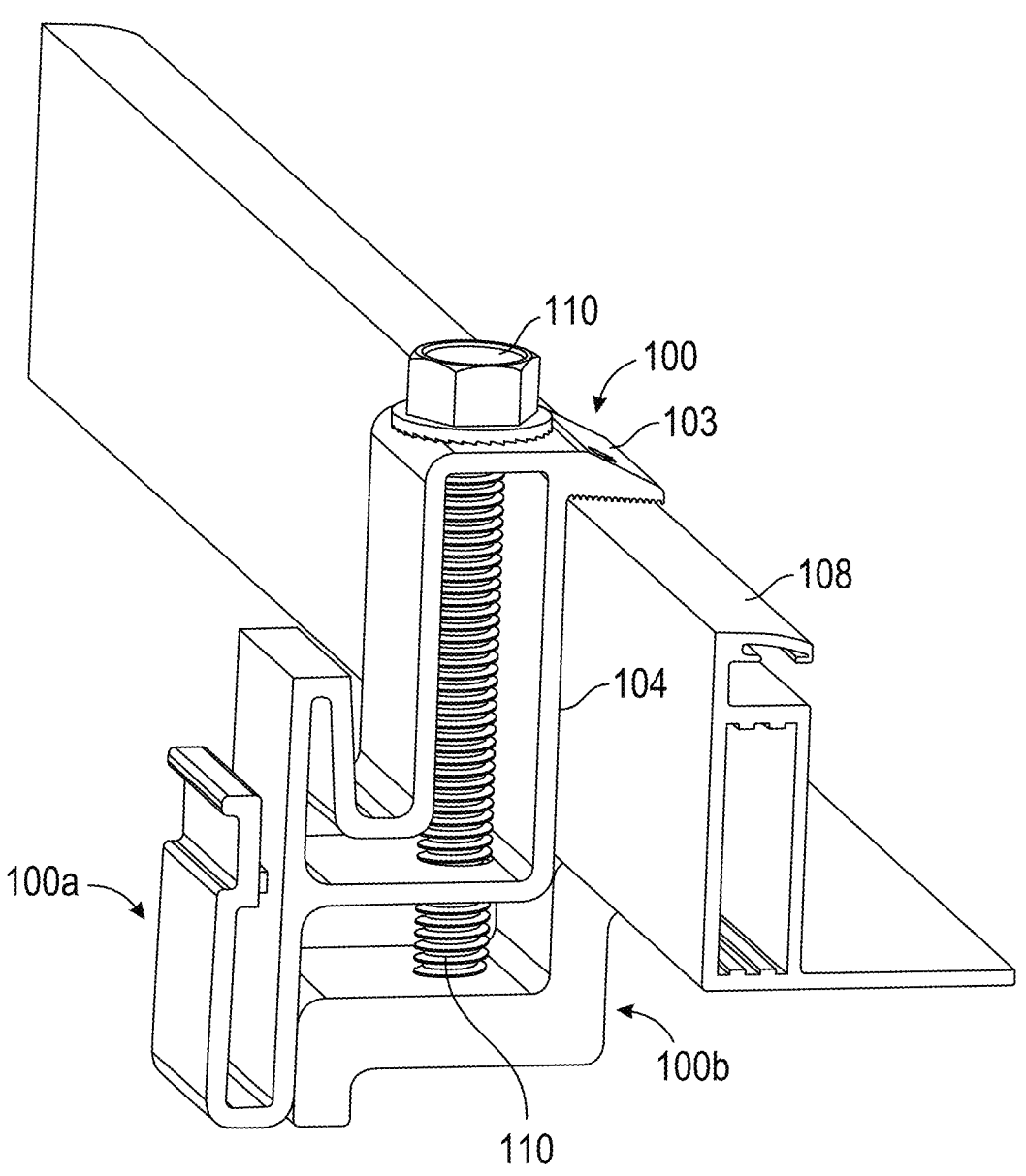
FIG. 28 is a perspective view of junction box attached to a solar panel rail according to a second alternative embodiment of the invention.

FIGS. 26 and 28 show the top clamp 103 and bottom clamp 102 in use securing the side of a module rail. The panel module fits within the clamping assembly 104 wherein the panel connection accessory 100 being the intermediary between the panel module and the junction box 10. Screw 110 (see FIGS. 26 and 28) is inserted through the through-pass 105 until the screw reaches the threaded hole 106 (see FIGS. 25 and 27) thereby connecting the first side 100a and the second side 100b together. When the screw is tightened, the top clamp 103 is drawn towards the bottom clamp 102 effectively clamping the accessory 100 to the solar panel module frame, as shown in FIGS. 26 and 28.

FIG. 27 shows a perspective view of a panel connection accessory configured to attach to the junction box according to a second alternative embodiment of the present invention and wherein the component is extruded as opposed to cast (see FIG. 24). FIG. 28 shows the clamp in use similar to as shown in FIG. 26.

In some embodiments, the flashing, rail, or roof mount and housing unit are a single unitary or integral component. In still other embodiments, the housing unit 12, rail 35, or flashing 74 may include a polycarbonate material infused with a hydroxyphenyl-benzotriazole material. In still further embodiments, the housing unit 12 may further comprise a first housing portion within a perimeter of a first circular, rectangular, or ovular depression, wherein the first housing portion within the perimeter of the first circular depression comprises a rubber seal element 27 as previously described, which in some embodiments may comprise ethylene propylene diene monomer (EPDM).

In some embodiments, the electrical enclosure can be mounted to a solar rail or racking or mounted directly to a roof 70 with code compliant traditional metal flashings, rails, or similar roof mount. The present invention can also optionally provide a code compliant flashed conduit pass through, as described above. In some embodiments, the bottom pass through is adapted to use with four strings or at least 100 Amps. In other embodiments, the mountable junction box 10 is adapted for use with common industry "din rails", conduit fittings, and wire fittings. As described above, a din rail 77 may form a universal channel to snap into a variety of conductor units, such as a direct wire to wire unit or a fused wire to wire unit. In this configuration, a din rail is fastened to the bottom surface utilizing a plurality of rail fastening means.

Alternative embodiments of the invention include 3R waterproof rated lectrical enclosures, providing waterproof pass throughs in combination with electrical enclosure elements, adapted to combine strings or a combining box that can be mounted to a solar panel support rail of a solar panel 80. As described above, the lip around the underside of the junction box may be encircled with a waterproofing indentation and/or a rubber seal, facilitating this high waterproofing rating. In other embodiments, the present invention includes a waterproofing zone 71, which is a location generally defined by the mating of the flashing continuous raised waterproofing track 45 and the junction box continuous waterproofing recess 25, and rubber seal element 27 therebetween as described above, and which is an area where an installer can drill through the box to affix it to the roof structure. In some embodiments, the waterproofing zone 71 may include an oval shaped area on the inside including two upstanding cylinders adapted for drilling, as described above. In some embodiments, within each of these cylinders is a small indentation that serves as a drill guide. In other embodiments, when a user rotates the junction box 180 degrees to expose the underside, the underside area is encircled, in part, with a waterproofing indentation and rubber seal.

In some embodiments, the invention is adapted to function with standard electrical industry parts and fittings and includes optional conduit pass through capabilities (i.e., a means to pass wiring through a roof structure). In other embodiments, the mountable junction box 10 includes drill guides 3 for properly locating holes or ports 13 drilled in the mountable junction box 10. Importantly, the mountable junction box 10 is mountable on a variety of rails in addition to metal flashings and roof mounts. In some embodiments, the waterproofing zone 71 prevents water infiltration through the roof while also providing structural stability. In some embodiments, a tapered raised flashing, rail, or roof mount protrusion may be included such that a flat or leveled off area is provided. In the preferred embodiment, this area can mate with a deformable seal located on the bottom surface of a recess in the bottom of the box that is shaped and configured to align with the flashing, rail, or roof mount protrusion. The waterproofing zone 71 is not limited to a single penetration or fastener.

In some embodiments, the at least one wiring system may include an electrical wiring system, a solar wiring system, a television wiring system from a satellite dish, a cable wiring system carrying internet, or the like. Further, in some embodiments the plurality of fixation points tightly secures at least one terminal component inside the housing unit. Corresponding to the plurality of fixation points, there is a bottom surface area designed for drilling and fixation of a junction box into a roof structure.

In one embodiment of the present invention, at least two of the plurality of fixation points are aligned with the ovular waterproofing indentation. In some embodiments, the junction box 10 is affixed on a rooftop utilizing a plurality of threaded screw elements, flashing, rail, or a roof mount. In other embodiments, each of the plurality of threaded screw elements extends downwards into a corresponding lock. In some embodiments, each of a plurality of threaded screw elements are configured to align with a flashing, rail, and/or roof mount member. Notably, the junction box 10 can be directly attached to the rooftop thereby improving the stability of the junction box 10.

The aforementioned versatile design of the housing unit 12 facilitates the installation of the junction box 10 on a given rooftop. With this design, the installer is not required to go to the rooftop in order to run the conduit to the junction box 10. Thereafter, he can complete the run to the source. In the preferred embodiment, the conduit is an electrical metal tubing (EMT).

In some embodiments, the bracket 30 is fastened proximate to the hinge region. In some embodiments, a conduit is inserted through the bottom pass through and the opening at the flashing, rail, or roof mount member. Thereafter, the conduit is tightened with the flashing, rail, or roof mount member utilizing a nut and a second sealing gasket. This simple and reliable method facilitates the connection between the conduit and the wiring system of the building.

In another aspect of the preferred embodiment, the mountable junction box 10 does not include a conduit for connecting the junction box 10 and the at least one wiring system of the building. This is the case where the roof top is integrated with roof top panel modules having spatial arrangement. In this arrangement, each panel module is separated spatially and their connection traverses from one group to another before dropping through the roof top. Since there is no conduit being used, this junction box 10 may not include a multithreaded flute and the conduit fastening assembly. Here, the wires and cables of the at least one wiring system pass through the sides of the junction box 10 without passing through the conduit. In certain cases, where a larger flashing, rail, or roof mount member does not fit on the roof, then two separate flashing, rail, or roof mount members are used, one for the satellite dish mount and the other for the junction box.

Yet another configuration of a mountable junction box is when the mountable junction box is designed to line up with the exterior wall of the building. This type of configuration is beneficial for people who do not want to penetrate through the roof top over a living space and who do not want to install the junction box 10 in the attic. Further, this configuration enables a wiring system to go through an overhang portion and simply drops down the exterior wall of the building.

The invention also includes a method for mounting a communication antenna, junction box or solar panel to a structure. The method includes the steps of first providing a junction box mounting assembly comprising; (i) a junction box including a housing unit and enclosing unit extending upwardly from the roof and forming an enclosed space, the housing unit having a top opening; and (ii) a communications cable is routed from exterior to the interior the junction box through the port opening into the enclosed space therein, then through the bottom port and to the exterior of the assembly. Next, a junction box is mounted to roof via a bracket and rail, or rather directly to the roof via flashing and fasteners. Finally, the junction box is connected to the cable, solar, or satellite system in order to deliver communications signals interior to the swelling structure.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described elements, the terms (including a reference to a "means") used to describe such elements are in order to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any particular application.

What is claimed is:

1. A junction box comprising:
a housing unit comprising an internal housing area further having a bottom surface, the housing unit mountable to a roof surface via a flashing having a continuous, raised waterproofing track that mates with a waterproofing recess in the bottom surface to create a waterproofing zone inside the housing unit;
wherein at least one bottom pass through is located within the waterproofing zone and provides a channel from the internal housing area through the roof surface; and
wherein the junction box is adaptable to attach to a panel connection accessory configured to connect with a panel module.

2. The junction box of claim 1, wherein the waterproofing zone within the junction box protects hot, neutral, and/or grounding wires in a closed configuration.

3. The junction box of claim 1, wherein the panel connection accessory comprises a clip with a projecting lip and wherein the housing unit comprises an exterior side comprising a tab with an opening.

4. The junction box of claim 3 wherein the clip is pushed between the tab and the housing unit exterior side, and wherein the projecting lip is removably snapped into the opening in the tab.

5. The junction box of claim 4, wherein an enclosing unit is attached to the housing unit via a hinge unit and the hinge unit includes a plurality of hinge unit joinder segments, the hinge joinder segments enabling removable attachment and detachment of the hinge unit.

6. The junction box of claim 4, wherein the tab deforms as the clip is pushed upwards between the tab and the housing unit exterior side.

7. The junction box of claim 1, wherein a compressible seal is positioned between said waterproofing track and said waterproofing recess.

8. The junction box of claim 1, wherein a housing unit lock and an enclosing unit lock combine to secure the mountable junction box in a closed configuration.

9. The junction box of claim 8, wherein the housing unit lock and the enclosing unit lock enable the enclosing unit to lock in a water-sealed engagement with the housing unit, thereby further preventing the entry of water into the housing unit.

10. The junction box of claim 1 wherein the panel connection accessory comprises a first accessory side including a clip designed to snap onto the junction box, a second accessory side positioned opposite to the first accessory side and a through-pass extending from a top portion of the panel connection accessory and leading to a threaded hole.

11. A junction box comprising:
a housing unit further comprising an internal housing area having a bottom surface and an exterior side; and
a panel connection accessory, comprising an overhanging portion, and a shelf;
wherein the exterior side and the panel connection accessory comprise complementary mating parts configured to secure the panel connection accessory to the housing unit;
wherein the panel connection accessory is removably connected to the housing unit and is configured to connect the housing unit to a panel module.

12. The junction box of claim 11, wherein a housing unit lock and an enclosing unit lock combine to secure the mountable junction box in a closed configuration, and wherein the housing unit lock and the enclosing unit lock enable the enclosing unit to lock in a water-sealed engagement with the housing unit.

13. The junction box of claim 12, wherein the enclosing unit is attached to the housing unit via a hinge unit, the hinge unit comprising a swiveling pivot.

14. The junction box of claim 11 wherein the clip is pushed between the tab and the exterior side of the housing unit, and the clip has a projecting lip removably snapped into an opening in the tab.

15. The junction box of claim 11 wherein the tab deforms as the clip is pushed upwards between the tab and the housing unit exterior side.

16. A junction box comprising:
a housing unit further comprising an internal housing area having a bottom surface with a recess configured to cooperate with a complementary flashing;
a bracket, the bracket comprising at least one lip fastener and at least one lip;
wherein the bracket is removably connected to the housing unit and is configured to connect the housing unit to said solar panel support rail;
a clamping accessory comprising a top clamp and bottom clamp, the top clamp acting in cooperation with the bottom clamp to clampingly secure the housing unit to a portion of a module frame;
wherein the clamping accessory is removably connected to the housing unit and is configured to connect the junction box to a panel module.

17. The junction box of claim 16, wherein an underside of the housing unit includes a depression waterproofing indentation and a rubber seal, the waterproofing indentation preventing water infiltration through the roof while also providing structural stability to the mountable junction box.

18. The junction box of claim 17, wherein the depression waterproofing indentation and the rubber seal forms a continuous shape with no right angles.

19. The junction box of claim 17 further comprising a screw that when tightened draws the top clamp towards the bottom clamp, effectively clamping the clamping accessory to the solar panel module frame.

20. The junction box of claim 16, wherein the housing unit is adapted to connect with wiring of a solar panel.

21. The junction box of claim 16 wherein a clip is a component of the panel connection accessory or the bracket, the clip configured to deform the tab as the clip is pushed between a housing unit exterior side and the tab.

22. The junction box of claim 16, wherein the panel connection accessory comprises a first accessory side including a clip designed to snap onto the junction box, a second accessory side positioned opposite to the first accessory side and a through-pass extending from a top portion of the panel connection accessory and leading to a threaded hole.

23. The junction box of claim 16, wherein the top clamp is an overhanging portion and the bottom clamp is a shelf.

24. A junction box comprising:

a housing unit further comprising an internal housing area having a bottom surface and an exterior side; and a panel connection accessory, comprising an overhanging portion, and a shelf;

wherein the exterior side and the panel connection accessory comprise complementary mating parts configured to secure the panel connection accessory to the housing unit;

wherein the panel connection accessory is removably connected to the housing unit and is configured to connect the housing unit to a solar panel module frame.

* * * * *